(12) United States Patent
Abercrombie et al.

(10) Patent No.: US 8,762,188 B2
(45) Date of Patent: Jun. 24, 2014

(54) CYBERSPACE SECURITY SYSTEM

(75) Inventors: Robert K. Abercrombie, Knoxville, TN (US); Frederick T. Sheldon, Knoxville, TN (US); Erik M. Ferragut, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 95 days.

(21) Appl. No.: 13/443,702

(22) Filed: Apr. 10, 2012

(65) Prior Publication Data
US 2012/0232679 A1  Sep. 13, 2012

Related U.S. Application Data

(63) Continuation-in-part of application No. 12/421,933, filed on Apr. 10, 2009, now abandoned.

(60) Provisional application No. 61/052,556, filed on May 12, 2008.

(51) Int. Cl.
*G06Q 10/00* (2012.01)
*G06Q 10/04* (2012.01)

(52) U.S. Cl.
CPC .................................. *G06Q 10/04* (2013.01)
USPC ........................................ 705/7.11; 705/7.36

(58) Field of Classification Search
USPC ................................................ 705/7.11–7.42
See application file for complete search history.

(56) References Cited

U.S. PATENT DOCUMENTS

| | | | |
|---|---|---|---|
| 7,024,388 B2 | 4/2006 | Stefek et al. | |
| 7,577,623 B2 * | 8/2009 | Genty et al. | 706/15 |
| 7,653,449 B2 | 1/2010 | Hunter et al. | |
| 7,653,593 B2 | 1/2010 | Zarikian et al. | |
| 7,672,866 B2 | 3/2010 | Venkatraman et al. | |
| 8,312,549 B2 | 11/2012 | Goldberg et al. | |
| 2003/0033542 A1 | 2/2003 | Goseva-Popstojanova et al. | |
| 2003/0120652 A1 * | 6/2003 | Tifft | 707/6 |
| 2004/0015728 A1 | 1/2004 | Cole et al. | |
| 2004/0024606 A1 | 2/2004 | Chukwu | |
| 2004/0103058 A1 * | 5/2004 | Hamilton | 705/38 |
| 2004/0111220 A1 | 6/2004 | Ochs et al. | |
| 2004/0230470 A1 | 11/2004 | Svilar et al. | |
| 2005/0027379 A1 * | 2/2005 | Dyk et al. | 700/79 |
| 2005/0050377 A1 | 3/2005 | Chan et al. | |

(Continued)

FOREIGN PATENT DOCUMENTS

JP        63-191268 A    8/1988
WO   WO 2004/070502 A2   8/2004

OTHER PUBLICATIONS

Frei, S., "Security Econometrics the Dynamics of (In) Security," Chapter 1, Sections 1.1-1.2, 2009, 23 pages.

(Continued)

*Primary Examiner* — Sujay Koneru
(74) *Attorney, Agent, or Firm* — Brinks Gilson & Lione

(57) ABSTRACT

A system evaluates reliability, performance and/or safety by automatically assessing the targeted system's requirements. A cost metric quantifies the impact of failures as a function of failure cost per unit of time. The metrics or measurements may render real-time (or near real-time) outcomes by initiating active response against one or more high ranked threats. The system may support or may be executed in many domains including physical domains, cyber security domains, cyber-physical domains, infrastructure domains, etc. or any other domains that are subject to a threat or a loss.

22 Claims, 7 Drawing Sheets

(56) References Cited

U.S. PATENT DOCUMENTS

| | | | |
|---|---|---|---|
| 2005/0102547 A1 | 5/2005 | Keeton et al. | |
| 2005/0171720 A1 | 8/2005 | Olson et al. | |
| 2007/0050239 A1 | 3/2007 | Caneva | |
| 2007/0150325 A1 | 6/2007 | Bjornson | |
| 2007/0177508 A1 | 8/2007 | Croak et al. | |
| 2007/0195691 A1 | 8/2007 | Volkerink et al. | |
| 2007/0237399 A1 | 10/2007 | Satonaga et al. | |
| 2008/0010522 A1* | 1/2008 | Uwatoko et al. | 714/23 |
| 2008/0052054 A1 | 2/2008 | Beverina et al. | |
| 2008/0082383 A1 | 4/2008 | Hollas | |
| 2008/0133300 A1 | 6/2008 | Jalinous | |
| 2008/0155656 A1 | 6/2008 | Agosta et al. | |
| 2008/0255910 A1* | 10/2008 | Bagchi et al. | 705/8 |
| 2008/0262895 A1 | 10/2008 | Hofmeister et al. | |
| 2008/0300933 A1* | 12/2008 | Britton et al. | 705/7 |
| 2009/0006156 A1 | 1/2009 | Hunt et al. | |
| 2009/0018880 A1* | 1/2009 | Bailey et al. | 705/7 |
| 2009/0024627 A1 | 1/2009 | King | |
| 2009/0031204 A1 | 1/2009 | Huang et al. | |
| 2009/0077666 A1* | 3/2009 | Chen et al. | 726/25 |
| 2009/0083089 A1 | 3/2009 | Conchieri et al. | |
| 2009/0109959 A1 | 4/2009 | Elliott et al. | |
| 2009/0281864 A1 | 11/2009 | Abercrombie et al. | |
| 2011/0137703 A1 | 6/2011 | Dugan et al. | |

OTHER PUBLICATIONS

Mili et al., "Measuring Reliability as a Mean Failure Cost" (2007) $10^{th}$ IEEE High Assurance Systems Engineering Symposium, p. 403-404.

Van Mieghem "Risk Mitigation in Newsvendor Networks: Resource Diversification, Flexibility, Sharing and Hedging" (Aug. 2007) Management Science, vol. 53, No. 8, pp. 1269-1288.

International Preliminary Report on Patentability in corresponding PCT/US2009/042931, application dated Nov. 25, 2010, pp. 1-5.

International Search Report and Written Opinion in corresponding PCT/US2009/042931, application dated Aug. 19, 2009, pp. 1-6.

F.T. Sheldon, R.K., Abercrombie and A. Mili, Evaluating Security Controls Based on Key Performance Indicators and Stakeholder Mission, May 12-14, 2008, pp. 1-4.

F.T. Sheldon, R.K. Abercrombie and A. Mili, Oak Ridge National Laboratory: Delivering $21^{st}$ Century Science and Technology, Evaluating Security Controls Based on Key Performance Indicators and Stakeholder Mission, Managed by UT-Battelle for the Department of Energy, May 14, 2008 (Version 1), pp. 1-10.

Ali Mili, "Measuring Dependability as a Mean Failure Cost", College of Computing Science, New Jersey Institute of Technology, Newark, NJ, Apr. 2, 2007, pp. 1-6.

F.T. Sheldon, R.K. Abercrombie and A. Mili, Oak Ridge National Laboratory: Delivering $21^{st}$ Century Science and Technology, Evaluating Security Controls Based on Key Performance Indicators and Stakeholder Mission, Managed by UT-Battelle for the Department of Energy, May 14, 2008 (Version 2), pp. 1-18.

Barry Boehm, Value-Based Software Engineering: Overview and Agenda, USC-CSE-2005-504, Feb. 2005, pp. 1-16.

Algirdas Avizienis, Jean-Claude Laprie, Brian Randell and Carl Landwehr, Basic Concepts and Taxonomy of Dependable and Secure Computing, IEEE Transactions on Dependable and Secure Computing, vol. 1, No. 1, Jan.-Mar. 2004, pp. 11-33.

Shari Lawrence Pfleeger and Thomas Ciszek, Security Processes, Choosing a Securing Option: The InfoSecure Methodology, Published by IEEE Computer Society, IT Pro Sep./Oct. 2008, pp. 31-37.

\* cited by examiner

Ranking potential threats: process for developing/refining and testing

| Ingestion/Discovery | | Evaluation | | | Metrics MOEs / MOPs | |
|---|---|---|---|---|---|---|
| Qualitative Input | Automated Discovery | Define System Relationships | Automated Asset Classification | Automated Asset Evaluation | Assets Group Assessment | Stakes, Dependency Threat Impact and Mitigation Matrices |
| • Seminally enhanced structural anomalies (ie., threat set) <br> • Contextual Semitics and threat scenarios <br> • System/asset criticality valuation <br> • Network map to loss value cost. <br> • Initialize scope assessment <br> • A priori security targets assessments by threat class and asset (mission requirements, stake holders and vulnerabilities) | • Discover all systems attached to the network/ enterprise. <br> • Normalize based on individual, cell or higher organization. <br> • Collect all possible psychosocial indicators. | • Connect all related systems <br> • Consult/ update comprehensive catalogue on indicators with constant updates | • Systems are grouped by universal criteria <br> • Grouping allows for a single evaluation template to be applied across all systems of the same class. | • Based on classification each system will be evaluated. <br> • Each system will have a score associated with it. | • Assets are reevaluated based on relationships defined earlier. <br> • Continue until all systems are evaluated. <br> • Re-evaluating directly connected systems, OSI Layer 2 systems and systems with the same layer 3 subnet. | • Generated and continually reevaluated as required. |
| | | Cyber Security Econometric System (CSES) Process | | Cyber envies <br> • Servers and Network Access Controls (internal/external) <br> • Monitoring and Assessment <br> • Infrastructure Devices <br> • Workstations <br> • Ancillary Devices | | |

Focus analyst's attention on developing situations that represent highest risk

| Classification/Valuation | Normalization/Ranking | Rationalization/Explicative |
|---|---|---|

FIG. 7

CYBERSPACE SECURITY SYSTEM

PRIORITY CLAIM

This patent is a continuation-in-part of U.S. Ser. No. 12/421,933 titled "System and Method for Implementing and Monitoring a Cyberspace Security Econometrics System and Other Complex Systems," filed on Apr. 10, 2009, which claims the benefit of priority under 35 U.S.C. §119(e) of U.S. provisional patent application Ser. No. 61/052,556, titled "System and Method for Implementing and Monitoring a Cyberspace Security Econometrics System and Other Complex Systems," filed on May 12, 2008, and is related to PCT Serial No. PCT/US09/42931 titled "System and Method for Implementing and Monitoring a Cyberspace Security Econometrics System and Other Complex Systems," filed May 6, 2009, the entire contents of which are hereby incorporated by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND

1. Technical Field

This disclosure relates to quantifying security, and particularly to risk-management technology that monetize stakeholder missions (requirements), system services, and/or assets (components of the underlying infrastructure) security threats and vulnerabilities.

2. Related Art

Mean-Time-To-Failure (MTTF) may represent the basic reliability of a complex and/or non-repairable system. In particular, MTTF represents the mean time expected until the first failure of a piece of equipment, a system, a complex device, computer network or subsystem, etc. Mathematically, MTTF may apply to a statistically large number of units, elements, networks or systems over a statistically significant period of time.

MTTF may assume that each of the elements, components, subsystems, etc. of a given system of interest is of equal importance or criticality to each of the users and/or stakeholders of the system. In other words, MTTF may assume that each of the elements, components, subsystems are equally critical to a system's operation, and that individual stakeholders or users of the system have an equal interest in the operation of each of the elements, components, subsystems.

SUMMARY

A system evaluates reliability, performance and/or safety by automatically assessing the targeted system's requirements. A mean-failure-cost quantifies the impact of failures as a function of failure cost per unit of time. The metrics or measurements render real-time (or near real-time) outcomes by initiating active responses against one or more high ranked threats. The expert systems may support many domains including physical domains, cyber security domains, cyber-physical domains, infrastructure domains, etc. or any other domains that are subject to a threat or a loss.

Other systems, methods, features, and advantages will be, or will become, apparent to one with skill in the art upon examination of the following figures and detailed description. The reference numbers included in the drawings designate components of the embodiments, where the same number may designate intermediate parts of the same component, for example, reference number 116 refers to parts 116a-116j. It is intended that all such additional systems, methods, features and advantages be included within this description, be within the scope of the invention, and be protected by the following claims.

BRIEF DESCRIPTION OF THE DRAWINGS

FIG. 7 is a process for identifying, assessing the potential impact, and/or refining or validating potential threats and/or identifying concomitant countermeasures/mitigation strategies.

DETAILED DESCRIPTION OF THE PREFERRED EMBODIMENTS

Figure 1:
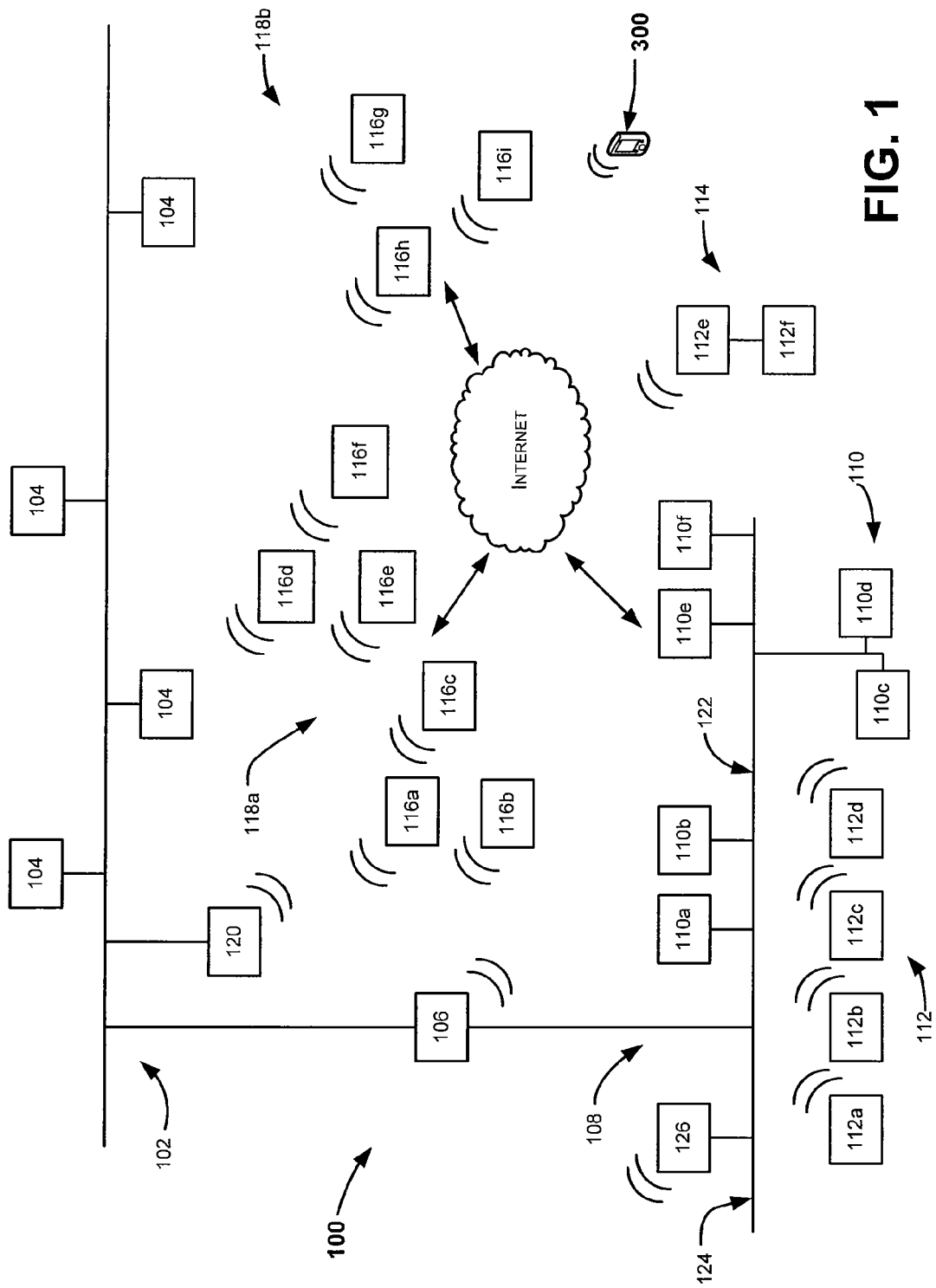
FIG. 1 is a network that may be implemented according to the disclosure.

Complex systems configured to serve, service or otherwise interact with a variety of parties or stakeholders may be, due to constraints in time, money and/or other business reasons, designed to balance a number of design constraints and/or requirements to address and provide the maximum reliability in the form of the service or interactions provided to the variety of parties and/or stakeholders.

I. Basis of Mean Failure Cost

A control system that provides effective security measures for a complex system may use reliable and/or effective security metrics and/or measurements. Security metrics and measurements may be utilized in security countermeasures that may select or identify alternative security architectures that may improve and/or monitor security in real-time during operation of the system. Characteristic or qualities of an effective security metric may include but are not limited to: (1) an ability to identify and measure properties necessary for decision making; (2) a value measurable in a quantitative manner; (3) a system or process capable of accurate and repeatable measurement; (4) a system or process independently verifiable via an outside datum or reference; and (5) a system or process that is able to provide or enhance the confidence level in the overall metric.

Additional characteristics or qualities of effective security metrics or measurements may: (A) be inexpensive, as a function of time and/or cost, to gather and/or determine; (B) can be independently refereed or audited (in terms of compliance, accreditation and certification); and/or (C) scalable between individual devices and computers to multiple devices and computers within an enterprise scale network.

Mean-Failure-Cost (MFC) may embody many/all of the characteristics of an effective security metric and may be utilized to quantify the impact of failures, interruptions, etc. as a function of failure cost per unit of time. Moreover, MFC may be utilized to determine and illustrate how much each stakeholder in a complex system may stand to lose as a result of, for example, a security failure, a hardware failure or any other service disruption.

MFC may be utilized within the framework provided by a Cyberspace Security Econometrics System (CSES) to design, implement and control a complex system. CSES may provide many advantages over other known measurement or analysis systems or methodologies because: (1) it reflects variances existing between different users or stakeholders of the system. Different stakeholders may attach different stakes to the same requirement or service (e.g., a service may be provided by an information technology system, cyber enterprise or process control system, etc.). (2) For a given stakeholder, CSES may highlight variances that may exist among the stakes attached to satisfying each requirement. For example, a stakeholder may attach or identify different stakes to satisfying different requirements within the overall system. (3) For a given compound specification (e.g., combination(s) of commercial off the shelf software and/or hardware), CSES may identify variances that may exist amongst the levels of verification and validation (V&V) that are performed on components of the specification. The verification activity may produce higher levels of assurance in satisfying some components of the specification than others.

The methodology, algorithm and/or computer implemented framework disclosed herein may be embodied by a CSES and utilized to design, control, and monitor one or more key attributes via sensors (e.g., devices that detect and measure something by converting non-electrical energy into electrical energy) or monitors associated with a system or process. For example, the attributes, requirements, etc. may support the decisions relating to (A) the design of security countermeasures, (B) the choice between alternative security architectures and responses to events such as intrusions or attacks and (C) the improvement of security (including reliability and safety) during both design and operations.

One example of a CSES, which is based on MFC, may be employed to determine and ensure that the cost of any verification and validation (V&V) effort is charged on the users and stakeholders according to what they stand to gain from the adjustment, change, and/or higher level of assurance, etc. This user or stakeholder based approach may replace traditional V&V schemes where effort is charged uniformly to each of the users or stakeholders regardless of the benefit derived with respect to each user or stakeholder. Hence if a particular V&V effort is aimed at improving the level of confidence that refines a component, device (e.g., that implements a service and or satisfies a requirement) operating within a given system, then the users or stakeholders are charged according to the stake they have in satisfying said requirement. Verification costs may further be considered to account for the possibility that one or more of the requirements of the system may be easier to verify than another requirement or component. Such costs depend on the requirement and the selected verification method or system.

II. Mean Failure Cost (MFC) as a Metric of Security

MFC (Mean Failure Cost) monetizes or quantifies in terms of dollars per unit of time (e.g. dollars per hour of system operation), the average loss or cost due to security threats or vulnerabilities. MFC may be utilized as a quantitative economic function, similar to Value Based Software Engineering (VBSE), to estimate the robustness of the system by matching the system's operational value against its mean failure cost. MFC, unlike some other known analysis tools, may account for variations between different stakeholder in the system by reflecting the difference in stakes that each stakeholder has in the operation of various components or devices comprising the system. Similarly, MFC may account for variations and customizations between different components/subsystems by reflecting the difference in security attributes of these components/subsystems resulting from different levels of V&V against the specified security target.

MFC, in an exemplary Cyber Security Econometrics System (CSES), may be determined according to, for example, an automated method or a distributed computer system that may be implemented in a master slave arrangement that includes a computer that is controlled by another computer, referred to as the master. The automated system or process may: (A) generate a stake matrix; (B) generate a dependency matrix, (C) generate a threat matrix and/or (D) generate a mitigation costs matrix.

Stakes Matrix: Stakeholder V. Requirements:

Generation of the some stakes matrix may (1) identify stakeholders in a system and (2) identify the security specifications and thus the security requirements associated with the system. For each stakeholder and each security requirement of the system, a stake may be identified which may correspond to the stakeholders interest in a particular security specification and/or security requirement. The stake may correspond to an estimated or real monetary or other cost that a particular stakeholder may incur due to the failure to satisfy the particular security specifications and/or security requirements associated therewith. Stake information may be measures, quantified and/or otherwise identified by the stakeholder or a quantifying system.

Estimation or derivation of some MFC metrics may depend on a stakeholder or stakeholder system assessing different stakes in different security requirements, and that the same security requirement may carry different stakes for different stakeholder designated interests. One representation may be stored in a two dimensional matrix, where the rows represent individual stakeholder's interests, the columns represent discrete security requirements and the entries represent stakes, as shown below in Table 1.

TABLE 1

The stakes matrix showing how Failure Cost (FC) is derived.

| STAKES MATRIX | | SECURITY REQUIREMENTS | | | | |
| --- | --- | --- | --- | --- | --- | --- |
| | | $R_1$ | $R_2$ | $R_3$ | ... | $R_n$ |
| STAKEHOLDERS | $S_1$ | | | | | |
| | $S_2$ | | | | | |
| | $S_3$ | | | | | |
| | ... | | | | $FC_i^j$ | |
| | $S_m$ | | | | | |

The failure cost (FC) entry at row i, column j, may represent a monetization or the cost that user or stakeholder $S_i$ would lose if the system failed to meet the security requirement $R_j$ (i.e., also represented as $FC(S_i, R_j)$). Table 1 is determined by assessing users or stakeholders. Each row may be derived by a system that assesses the corresponding stakeholder, that may be designated in a predetermined (possibly distinct) financial/economic terms (e.g., dollars, person months, euros, etc.).

The stakes matrix provides a way to estimate MFC associated with a stakeholder $S_i$ utilizing the formula:

$$MFC(S) = \sum_{R_i} P(R_i) \times FC(S, R_i),$$

where $P(R_i)$ represents the probability that the target system fails to meet requirement $R_i$. Stated another way, the MFC for a stakeholder S is the sum, for all requirements $(R_i)$, of the failure costs associated with these requirements weighted or adjusted by the probability of failing them. The stakes matrix may be processed to determine the terms $FC(S,R_i)$, while a dependency matrix may be processed to determine the probability (P) terms.

Dependency Matrix: Requirements V. Components

A dependency matrix may be utilized to estimate the probability that one of the identified security specifications is not satisfied and/or that one of the identified security requirements $(R_i)$ is violated during a period of time. The dependency matrix, as shown in Table 2, links the probability of failing to provide or satisfy requirement $(R_i)$ with the probability of a component or device failure within the system. The identification of the link between the failure to satisfy requirement $(R_i)$ and the probability of a components failure may require an analysis of the system architecture to determine the contribution of each component to a given requirement.

TABLE 2

The dependency matrix linking requirement with components.

| DEPENDENCY MATRIX | COMPONENTS | | | | |
|---|---|---|---|---|---|
| | $C_1$ | $C_2$ | $C_3$ | ... | $C_k$ |
| REQUIREMENTS $R_1$ | | | | | |
| $R_2$ | | | | | |
| $R_3$ | | | | | |
| ... | | | | | $\pi(R_i|E_j)$ |
| $R_n$ | | | | | |

The dependency matrix illustrates the relationship between requirements and their respective components and failure results. Stated another way, the dependency matrix provides a way to estimate the probability that the target system fails to meet requirement $R_i$ is the sum for all of the failure Events j related to component $C_i$ utilizing the formula:

$$P(R) = \sum_{i=1}^{k+1} \pi(E_i) \times \pi(R|E_i),$$

where (as shown in Table 2) $C_1, C_2, C_3 ... C_k$ are components of the system the term $E_i$ represents the Failure of Component $C_i$ event, and $E_{k+1}$ represents the No Component has Failed event (or non-event). The term $\pi(E_i)$ represents the probability of event $E_i$ and the term $\pi(R|E_i)$ represents the probability of a failure to satisfy requirement R represents given the hypothesis $E_i$ (e.g., that the event i $(E_i)$ has occurred.) In some applications, it may be assumed that in the absence of component failures, security requirements are vacuously satisfied and may be represented by the expression:

$$\pi(R|E_{k+1})=0$$

Impact Matrix: Component Failure V. Threats or Vulnerabilities

Generation or construction of an impact matrix to determine the probability of component failure may depend on the evaluation of a number of factors. For example, (1) the protection (e.g., the armor, the technical controls, the fallback strategies, and other known V&V strategies and tools) afforded components against threats or vulnerabilities and/or failures or which provide redundancy against a successful threat or attack. (2) The pattern of threats or vulnerabilities or attacks to which the component may be subjected. This may include defining or establishing one or more threat or vulnerability models to catalog what threats or vulnerabilities or families of threats or vulnerabilities against which protection may be required. An example of threat or vulnerability classifications that may be incorporated into the threat or vulnerability model includes: insider threats or vulnerabilities; intrusions (including malware, break-ins, spoofing, phishing and other social engineering methods); denial of service threats or vulnerabilities; authentication threats or vulnerabilities; and other known and/or foreseeable threats or vulnerabilities. (3) The degree to which a given component has undergone verification and validation (V&V) through testing, inspection, static analysis, etc.

To assess the likelihood that a particular threat or vulnerability within the threat or vulnerability model may result in the failure of the component $C_k$, we may consider a set of cataloged threats or vulnerabilities (or families of threats or vulnerabilities with common attributes), say $T_1, T_2, T_3, ... T_h$, and we may consider the events $V_1, V_2, V_3, ... V_h, V_{h+1}$, where $V_i$, for $1 \le i \le h$, stands for: threat i has materialized, and $V_{h+1}$ stands for: no threat i has materialized. Because events $V_i$, for $1 \le i \le h+1$, are complementary (if we assume that no more than one threat materializes at a time), we can utilize the formula:

$$\pi(E_i) = \sum_{j=1}^{h+1} \pi(V_j) \times \pi(E_i|V_j),$$

to link the probability of threat $T_j$ (which is $\pi(V_j)$) to the probability of a failure of component $C_i$ (which is $\pi(E_i)$). The conditional probabilities between the threats or vulnerabilities and the component may be derived utilizing the impact matrix illustrated in Table 3.

TABLE 3

The impact matrix showing component failure versus threats or vulnerabilities relationship grouping

| IMPACT MATRIX | THREATS OR VULNERABILITIES | | | | |
|---|---|---|---|---|---|
| | $T_1$ | $T_2$ | $T_3$ | ... | $T_h$ |
| COMPONENTS $C_1$ | | | | | |
| $C_2$ | | | | | |
| $C_3$ | | | | | |
| ... | | | | | $\pi(E_i|V_j)$ |
| $C_k$ | | | | | |

The impact matrix may be filled by expert systems that (e.g., may use knowledge based engines and/or inference engines and may) apply analytical rules established by analysts and security experts or through other means that may automatically assess the impact that each type of threat or vulnerability may have on the operation of a given component. In other embodiments, other automated mechanisms such as, for example, a Common Vulnerability Scoring System (CVSS), or semi-automated mechanisms such as, for example, Subject Matter Experts (SMEs) may be utilized. By this example, the probability of failing a requirement is obtained by the sum, for all components, of the conditional probabilities of failing that requirement, conditional on failure of the component, weighted by the probability of failure of the component.

Mitigation Costs Matrix

Generation of a mitigation costs matrix provides an exemplary mechanism and methodology by which mitigation costs associated with a potential threat, as well as failure costs, may be addressed and encompassed by the MFC metric. In particular, the dependency $D_j$ may be quantified by correlating, as shown in Table 4, the failure of a component within the system with the failure to provide a service or satisfy a requirement.

TABLE 4

Mitigation cost matrix linking service/requirement and component mitigation costs

| MITIGATION COST MATRIX | COMPONENTS | | | | |
|---|---|---|---|---|---|
| | $C_1$ | $C_2$ | $C_3$ | $C_4$ | $C_5$ |
| SERVICES $S_1$ | | | | | Verification Cost by Service $VS_1$ |
| $S_2$ | | | | | $VS_2$ |
| $S_3$ | | | | | $VS_3$ |
| $S_4$ | | | $D_i^j$ | | $VS_4$ |
| $S_5$ | | | | | $VS_5$ |
| Verification Cost by Component | | | | | |
| | $VC_1$ | $VC_2$ | $VC_3$ | $VC_4$ | $VC_5$ |

The dependency $D_i^j$ may be combined with the cost of verifying each of the components that, in turn, can be processed to estimate of the probability of service delivery as a function of the effort invested to enhance the robustness of the component. This estimate may be processed, discretely and in real-time, to identify and prioritize which components to enhance, upgrade or otherwise service. The estimate may further be processed to determine an amount to charge a given stakeholder as a function of their derived benefit according to the formula:

$$VS_i = \sum_{j=1}^{n} D_i^j \times VC_j.$$

III. Results Analysis and Implementation

Analysis of the above-defined results may be summarized as the vector of mean failure costs (MFC, one entry per stakeholder) as defined by the following equation:

$$MFC = ST \cdot PR,$$

where ST is the stakes matrix and PR is the vector of requirement failure probabilities (one entry per requirement).

The vector of requirement failure probabilities is given by the following equation:

$$PR = DP \cdot PE,$$

where DP is the dependability matrix and PE is the vector of component failure probabilities (one entry per component).

The vector of component failure probabilities is given by the following equation:

$$PE = IM \cdot PV,$$

where IM is the impact matrix and PV is the vector of threat emergence probabilities (one entry by type of threat).

By substitution, we find the equation that gives us vector of mean failure costs of all stakeholders as:

$$MFC = ST \cdot DP \cdot IM \cdot PV,$$

where vector PV represents the probability of emergence of the various threats or vulnerabilities that are under consideration. This probability may be provided by any one of the artificial intelligence, expert systems (e.g., that may include knowledge based engine and/or inference engine), system users, architects and other experts or users, or it may be determined empirically, by simulating and/or operating the system for some length of time and estimating the number of threats or vulnerabilities that emerge during that time and may be refined continuously as the system evolves.

The information may, in turn, be processed to identify potential weaknesses within a given system and allow the user or stakeholder to determine the cost benefit of addressing each weakness with respect to their given mission or objectives. The information may further be processed to render a control strategy for implementation or transmit data to a system that may minimize the identified weaknesses in a cost effective manner.

IV. Exemplary Implementation of a CSES

FIG. 1 illustrates an exemplary network 100 that may incorporate the methods, systems and teaching provided herein. The network 100 may include a first network 102 in communication with one or more controllers such as a plurality of terminals 104 and a router 106. The router 106 may couple the first network 102 to a second network 108. The first network 102 may be wired or wirelessly coupled or in communication with the second network 108. The second network 108, in this exemplary embodiment, may include a first wired network portion 122 and a second wired network portion 124 that connect to network elements or devices 110 (individually identified as network elements or devices 110a to 110f). The second wired network portion 124 may be coupled to network elements or devices 112 via a wireless device 126. For example, the network elements or devices 112 may include wireless devices individually identified as devices 112a to 112f. In one embodiment, the device 112f may be a wired device that may or may not, include wireless functionality that connects to the device 112e. In this configuration, the network device 112f may utilize or share the wireless functionality provided by the network device 112e to define an interconnected wireless node 114. The network elements or devices 112a to 112f may, in turn, communicate or connect to the first network 102 via, for example, the router 106 and/or an wireless device 126. The wireless device 126 may be a router, a hub or node, a server or any other networkable device in communication with the second wired network portion 124 which, in turn, may be in communication with the first network 102.

The network 100 may further include network elements or devices 116 which may be individually identified by the reference numerals 116a to 116i. The network elements or devices 116a to 116i may be configured or arranged to establish one or more wireless networks or system such as the sub-networks 118a and 118b. The network elements or devices 116a to 116i may be any networkable device such as, for example, servers, terminals, hubs and/or nodes. Alternatively, each of the network elements or devices 110, 112 and 116 may represent another network or system in communication with the network 100. As shown in FIG. 1, the network elements or devices 110, 112 and 116 may be configured to communicate in either a wired or wireless manner with, for example, a wireless router or hub 120, the internet, an intranet or other communication network or system.

The network 100 may be any complex system, process or operation that includes, for example, one or more stakeholders, one or more devices or components and which may be vulnerable to one or more internal and/or external threats. For example, the network 100 may include one or more stakeholders associated with the network devices 112a to 112f. As previously discussed, the network devices 112a to 112f may communicate with the wireless device 126 operable on the second wired network portion 124 of the second network 108. In this configuration, the stakeholders associated with the wireless devices 112a to 112f have a stake in the continued operation of both the wireless device 126 and the second wired network portion 124 of the second network 108. Similarly, the network devices 110a to 110f may be associated with one or more stakeholders. The stakeholders associated with the network devices 110a to 110f may, in turn, have a stake in the continued operation of first wired network portion 122 of the second network 108. In this configuration, the stakeholders associated with both groups of network devices 110 and 112 may have an additional stake in the continued operation and connectivity provided by the router 106 in order to connect to the first network 102.

The sub-networks 118a and 118b and the included network devices 116a to 116i may likewise be associated with one or more stakeholders. The stakeholders associated with the network devices 116a to 116i may have a stake in the continued communications within each of the sub-networks 118a and 118b as well as the wireless router 120 which provides access to the first network 102. Stakeholders associated with the terminals 104 may have a stake in the continued operation of the router 106 and/or the wireless router 120 to maintain communications and connectivity with the second network 108 and the sub-networks 118a and 118b.

The network 100 may be evaluated as a series interconnected processing nodes, data nodes and devices 110, 112, 116, etc. Security requirements may require various partitions, e.g., the sub-networks 118a, 118b, of the network 100, for the sake of protection, risk mitigation, and access control. Stakeholders to the network 100, sub-networks 118a, 118b, etc. may be users or user communities that can be characterized by: (1) the set of nodes or the sub-network or network to which they have access or have a stake; (2) the services that they expect from (their part of) the sub-network or network; and (3) the stakes they have in the delivery of these services.

The same sub-network 118a, 118b, device 110, 112, and 116 may serve more than one user or stakeholder; may deliver different services to different users and stakeholders; and may carry different stakes for different stakeholders. Thus, the network 100 may not be evaluated in a centralized review, but rather from individual stakeholder processes; each stakeholder may define a specific mission within the enterprise, and attaches specific stakes to accomplishing this mission.

Table 5 illustrates an example of a stakes matrix that may be assembled or constructed to address one or more exemplary security requirements that may be of interest to the stakeholders on the network 100.

TABLE 5

The stakes matrix showing how Failure Cost (FC) is derived.

| STAKES MATRIX | | REQUIREMENTS | | |
|---|---|---|---|---|
| | | $R_1$ - Access Control | $R_2$ - Freedom From Insider Threat | R3 - Protection of Critical Data |
| STAKEHOLDERS | $S_{104}$ | Unable to utilize resource on the First and Second Networks 102, 108 | Prevents real-time control and monitoring | Ensure Validity and Safety of Mission Critical Information |
| | $S_{110}$ | Inability to Communicate with the Second Network 108 | Prevents real-time control and monitoring | Ensure Validity and Safety of Mission Critical Information |
| | $S_{112}$ | Inability to share communications resources | Prevents sharing of wireless capabilities (see 112e and 112f) | Secure Communication of Mission Critical Information |
| | $S_{116}$ | Lack of operability within the Sub-Networks | Effectively prevents the use of the Sub-Networks | Secure Communication of Mission Critical Information |

FC may be represent as a dollar per unit of time value such as, for example, dollars per hour ($/hr) or simply as a dollar loss value.

The exemplary stakes matrix may serve to link and highlight each individual stakeholder's stake or interest in a given security requirement or aspect of the network 100. Individual costs or expenses may be identified and associated with each of the potential failures defined in the stakes matrix. For example, in a case where stakeholder $S_{112}$ cannot share communication resources, as specified by requirement $R_1$, the lost opportunity cost is determined or may be estimated by the stakeholder $S_{112}$ process and assessed and/or added towards the stakeholder's share of the startup/mitigation costs associated with implementation and maintenance of requirement $R_1$.

TABLE 6

The dependency matrix linking requirement with components.

|  |  | COMPONENTS | | | |
| --- | --- | --- | --- | --- | --- |
| DEPENDENCY MATRIX | | Processing Component $C_{104}$ | Login Component $C_{106}$ | Secure Storage Component $C_{120}$ | User Profile Analysis $C_{126}$ |
| REQUIRE-MENTS | $R_1$ - Access Control | 0.01 | 0.98 | 0.40 | 0.10 |
| | $R_2$ - Freedom From Insider Threats | 0.01 | 0.60 | 0.20 | 0.98 |
| | $R_3$ - Protection of Critical Data | 0.01 | 0.20 | 0.98 | 0.20 |

Table 6 illustrates an exemplary dependency matrix that may be constructed in. The exemplary dependency matrix may serve to link and highlight the specific components ($C_{104}$, $C_{106}$, $C_{120}$ and $C_{126}$) with the individual security requirements that they may affect and/or influence. The probabilities listed in the dependency matrix serve to indicate the degree to which a given component is responsible for providing or satisfying a given requirement.

TABLE 7

The impact matrix showing component failure versus threats or vulnerabilities relationship grouping

|  |  | THREATS OR VULNERABILITIES | | | | |
| --- | --- | --- | --- | --- | --- | --- |
| IMPACT MATRIX | | $T_1$ - Insider Threat | $T_2$ - Intrusions | $T_3$ - Denial of Service | $T_4$ - Authentication | NO Threat |
| COMPO-NENTS | $C_{104}$ | 0.20 | 0.40 | 0.80 | 0.80 | 0.00 |
| | $C_{106}$ | 0.20 | 0.20 | 0.20 | 0.20 | 0.00 |
| | $C_{120}$ | 0.20 | 0.40 | 0.20 | 0.20 | 0.00 |
| | $C_{126}$ | 0.20 | 0.10 | 0.10 | 0.10 | 0.00 |

Table 7 provides an exemplary impact matrix that may be constructed. The exemplary Impact matrix may serve to link and highlight the specific components ($C_{104}$, $C_{106}$, $C_{120}$ and $C_{126}$) with the individual security threats or vulnerabilities that may affect and/or disrupt their operation, ability to provide a given service and/or satisfy one or more of the identified security requirements. The system and processes may recognize that threats do not pose a danger or risk unless a component has one or more vulnerabilities. A vulnerability may exist or it may not (e.g., it may comprise a discrete value). To identify its impact or claim, the system and processed may account for existing threats (e.g., Advanced Persistent Threat) that may then be processed against known or potential vulnerabilities.

Table 7 may be expanded to include additional rows and columns representing any number of components and threats or vulnerabilities. Some of the components ($C_{104}$, $C_{106}$, $C_{120}$ and $C_{126}$) may not be impacted by a given threat or vulnerability and as such, the entry would be zero or no threat. Furthermore, some components may not be completely covered by the threats or vulnerabilities (e.g., row sum <1.0) thereby representing the degree of an absence of a threat or vulnerability.

The information provided and/or determined via these matrices may, in turn, be analyzed to arrive at an MFC metric. The MFC metric may be processed by, for example, a system architect or designer, an automated control or design system, a control system (operating in real-time or in an offline fashion) or other analysis systems to identify potential vulnerabilities within the network 100. These potential vulnerabilities may, in turn, be targeted by specific V&V efforts or other testing and/or security protocols in order to mitigate and or minimize the vulnerabilities associated therewith.

Figure 2:
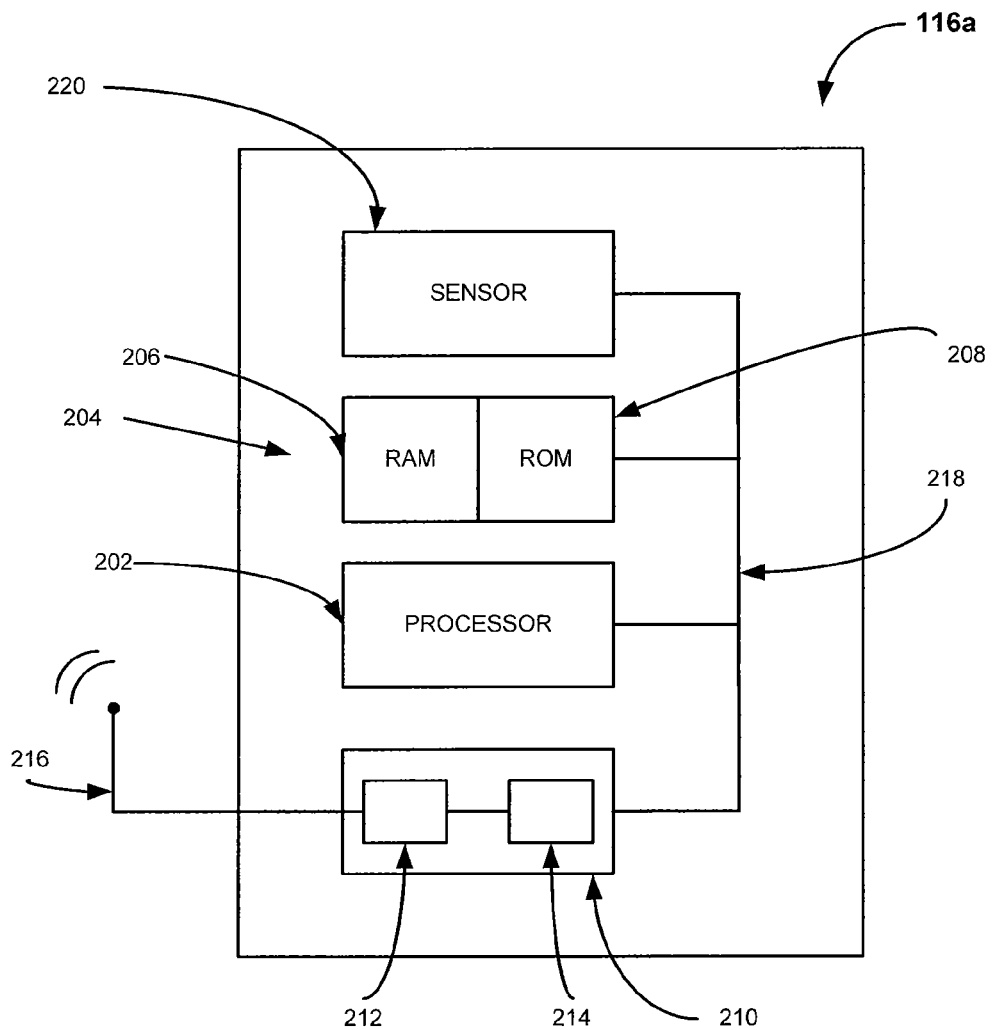
FIG. 2 is a network device or element that may be utilized in connection with the network shown in FIG. 1.

FIG. 2 illustrates an exemplary detailed view of one of the network elements or devices 116a to 116i. In particular, FIG. 2 illustrates the network element or device 116a. The network device 116a in this exemplary embodiment may include a processor 202 or signal processor that may comprise an INTEL® PENTIUM®, an AMD® ATHLON® or other processors in communication with a memory 204 or storage medium.

The memory 204 or storage medium may contain random access memory (RAM) 206, flash or non-flash read only memory (ROM) 208 and/or a hard disk drive (not shown), or any local or remote (e.g., cloud based) storage device or mechanism. In other embodiments, the memory 204 may constitute a database comprising files composed of records, each of which contains fields, together with a set of operations for searching, sorting, recombining, and other functions that may be stored in a non-volatile medium. The network element or device may further include a communication component 210. The communication component 210 may include, for example, the ports, hardware and software necessary to implement wired communications with the control network 100. The communication component 210 may alternatively, or in addition to, contain a wireless transmitter 212 and a receiver 214 (or an integrated transceiver) communicatively coupled to an antenna 216 or other broadcast hardware.

The sub-components 202, 204 and 210 of the exemplary network device 116a may be coupled and configured to share information with each other via a tangible or wireless communications bus 218. Computer readable instructions or code such as software or firmware may be stored on the memory 204. The processor 202 may read and execute the computer readable instructions or code via the communications bus 218. The resulting commands, requests and queries may be provided to the communication component 210 for transmission via the transmitter 212 and the antenna 216 to other network elements or devices 110, 112 and 116 operating within the first and second networks 102 and 108. Sub-components 202 to 218 may be discrete components or may be integrated into one (1) or more integrated circuits, multi-chip modules, and/or hybrids.

Figure 3:
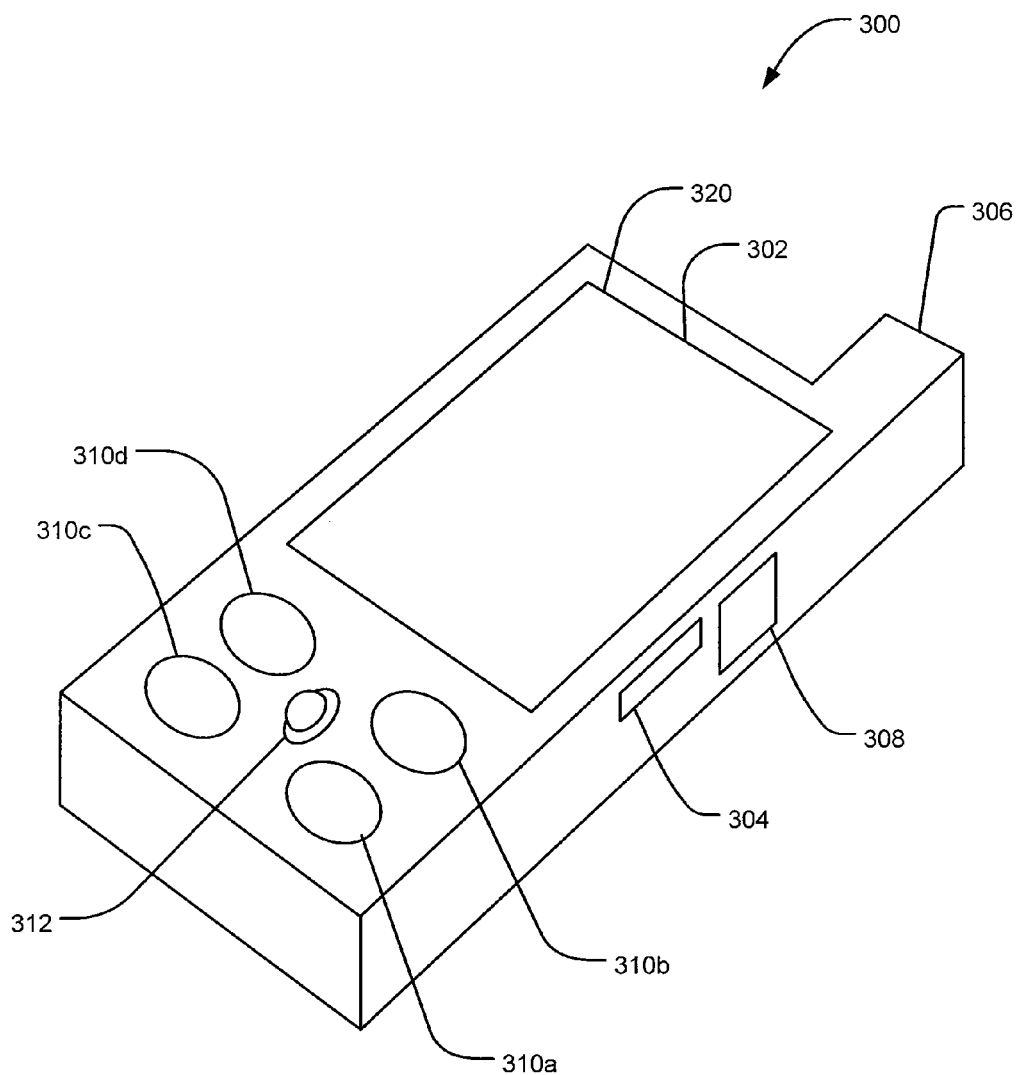
FIG. 3 is a device for use in implementing and monitoring the components, devices and network.

FIG. 3 illustrates an exemplary embodiment of a device or system 300 that may be utilized in cooperation with the one or more of the elements, components, devices 110, 112 and 116 and/or the network 100 as a whole. The device or system 300 may be configured to or execute an econometric control system or schema related to the network 100 and/or each of the devices or elements 110, 112, 116, etc. operable therein.

The device or system 300 may be, for example, a mobile computer, a personal digital assistant (PDA) or smart phone utilizing, for example, Advanced RISC Machine (ARM) architecture or any other system architecture or configuration. The device 300, in this exemplary embodiment, may utilize one or more operating systems (OS) or kernels such as, for example, OS® X LION, PALM OS®, MICROSOFT MOBILE®, BLACKBERRY OS®, SYMBIAN OS® and/or an open LINUX™ OS. These or other operating systems could allow programmers to create a wide variety of programs, software and/or applications for use with the device 300.

The device 300 may include a touch screen 302 for entering and/or viewing configuration information or data, a memory card slot 304 for data storage and memory expansion. For example, the touch screen 302 may be configured to present or display a graphical user interface (GUI) generated and provided by a processor similar or identical to the processor 202 or one or more of the ASIC devices. The processor may be a single processor or a symmetric processor architecture tasked with interacting with and/or processing information stored on a memory such as the memory 202. Alternatively, the processor may encompass one or more application-specific integrated circuits (ASIC) configured to, for example, (1) generate and control a user interface; (2) analyze information stored or accessible via the memory; (3) formulate and/or implement a control strategy based on the analyzed information. For example, the memory could store the information necessary to construct the matrices discussed above, the control and analysis code necessary to analyze this information and any other tools or interfaces necessary to implement or evaluate an MFC-based CSES. The user may, in turn, interact with the touch screen 302 to populate the matrices discussed above, review or interact with the MFC-based CSES or any other task necessary to operating and/or controlling the network 100.

The memory card slot 304 may further be utilized with specialized cards and plug-in devices such as, for example, a wireless networking card, to expand the capabilities of functionality of the device 300. The device 300 may include an antenna 306 to facility connectivity via one or more communication protocols such as: WiFi (WLAN); Bluetooth or other personal area network (PAN) standard; cellular communications and/or any other communication standard. The device 300 may further include an infrared (IR) port 308 for communication via the Infrared Data association (IrDA) standard. The device 300 may be configured and designed with a communication component similar to, and compatible with, the communication component 210 shown and discussed in connection with FIG. 2. The communication components utilized within one or more of the network elements or devices and the device 300 may be selected and configured to be inter-compatible and compliant with any one of the communication protocols or standards discussed herein. The device 300 may, in an embodiment, include or incorporate the components, elements and/or functionality within the device shown in FIG. 2.

Hard keys 310a to 310d may be provided to allow direct access to predefined functions or entrance of information via a virtual keyboard provided via the touch screen 302. The number and configuration of the hard keys may be varied to provide, for example, a full QWERTY keyboard, a numeric keyboard or any other desired arrangement. The device 300 may further include a trackball 312, toggle or other navigation input for interaction with emergency information or data presented on the touch screen 302.

The device 300 may communicate with, for example, the deployed devices 116a to 116i and the router 106, the wireless router or hub 120 and/or the wireless device 126. In this way, the device 300 may implement an econometric control system or scheme and communicate and/or adjust the network devices or systems based on the results of the implementation. In particular, the device 300 may adjust or evaluate each of the devices operating within the network 100 to assist in the design and construction of the system, or may iteratively adjust or evaluate the devices to provide ongoing control and protection of an existing system.

Figure 4:
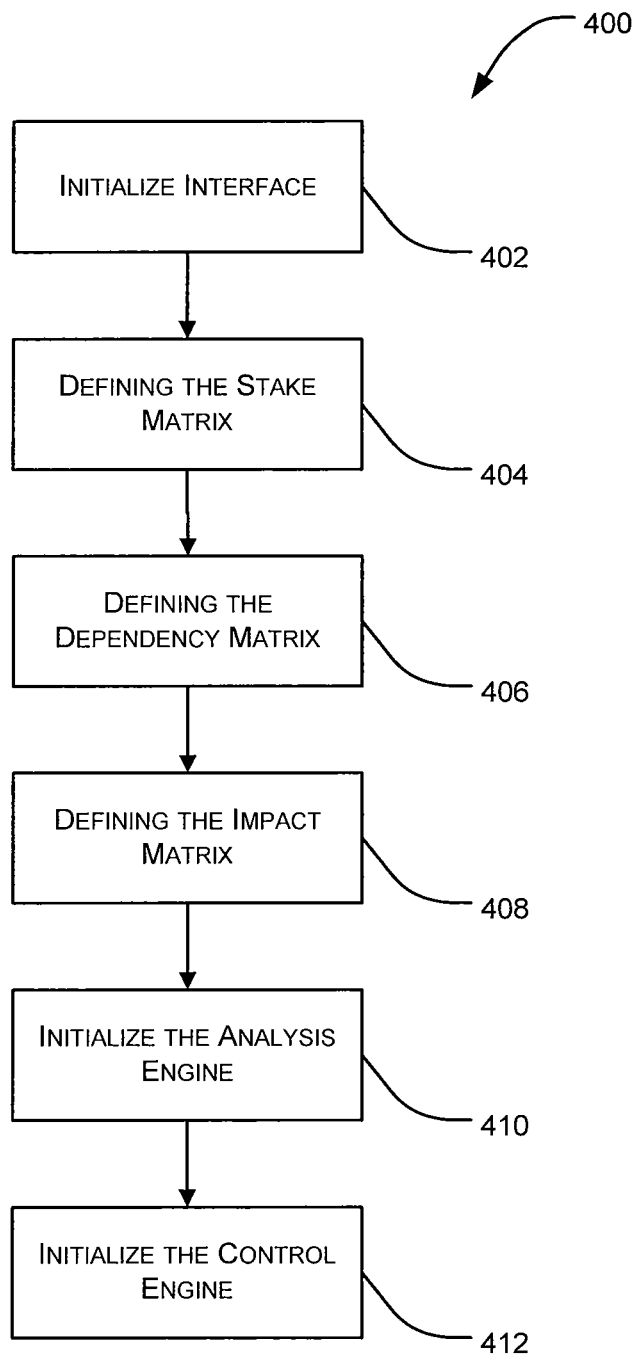
FIG. 4 is an algorithm for defining and/or implementing an MFC-based control system.

FIG. 4 depicts a flowchart 400 that illustrates the acts and/or methods that may be undertaken in connection with an MFC-based CSES. The steps, tasks and/or methodology may be executed on, for example, the device 300, one of the terminals 104 or any other device that may be utilized in connection with the network 100.

At block 402, a processor or ASIC, similar or identical to the processor 202, within the device 300 may initialize an interface engine. The interface engine may be an expert system configured to guide a user through the process of establishing or interfacing with the CSES. Alternatively, or in addition to, the interface engine may be a graphical user interface (GUI) configured for display on the touch screen 302. The GUI may prompt or interact with the user to and guide them through the procedure of setting-up the CSES.

At block 404, the interface engine may prompt or interact with the user(s) to gather stakeholder information related to the stakeholders of the network 100. Moreover, the interface engine may gather information from the user(s) to identify the security specifications or requirements of interest to each of the stakeholders and to be provided by the network 100. In some processes, the interface engine may gather the information from remote or local databases without user input.

At block 406, the interface engine may prompt or interact with the user(s) or independently gather component information related to the security specifications or requirements of interest to each of the stakeholders as provided at block 404.

At block 408, the interface engine may prompt or interact with the user(s) and/or may utilize empirically gathered information or independently gather information regarding the possible threats or vulnerabilities that may be experienced by the network 100. The interface engine may, in turn, be utilized to relate the possible threats or vulnerabilities to the components of the network 100 likely to experience the effects of the threats or vulnerabilities.

At block 410, the processor or ASIC, similar or identical to the processor 202, within the device 300 may initialize an analysis engine. The analysis engine may utilize the information stored gather at least at blocks 404 to 408 to determine of calculate at least one MFC metric for the network 100.

At block 412, the processor or ASIC, similar or identical to the processor 202, within the device 300 may initialize a control engine. The control engine may utilize at least one MFC metric determined at block 410 to generate a control strategy for the network 100. The control strategy may be implemented in real-time (or near real-time) as the network 100 operates or may be generated offline and provided or uploaded to the network 100 during a schedule maintenance cycle or some other convenient period. Alternatively, the control engine may be utilized to provide guidance and/or information to the operators, designers and other interested parties of network 100 toward thwarting or eliminating threats or vulnerabilities (e.g., data corruption, extrusion which is the accidental release/leak of sensitive data, exfiltration which is the result of deliberate unauthorized loss of sensitive data (e.g., may occur when data is stolen), or other misuse including fraud or damage). In this usage, "threats" refers to the damage that results when a threat emerges. If a system or process encrypts data and makes backups, the system may minimize the impact of data corruption. But data corruption itself may not be the threat, the process, system, or user whom corrupts the data may be a threat. The guidance or information may be utilized to allocate maintenance such as protective measures and upgrade resources and determine a V&V schedule and priority list for the components operable within the network 100.

The process may run continuously in a real-time analysis and control mode or it may be utilized at discrete time intervals for a spot check and or maintenance. Alternatively, the process illustrated by the flowchart 400 may be utilized as a design tool to aid in the set up and configuration of the network 100 and the selection or identification of the components to be utilized therein.

V. First Exemplary Utilization of an MFC Metric

In another embodiment, the MFC-based CSES may be utilized to analyze another complex system. For example, CSES may be utilized in connection with a flight control system (FCS) on board a commercial aircraft that includes representative stakeholders, requirements, and stakes (failure costs). In this embodiment, the stakeholders may, for example, include: the aircraft pilot; the passengers; the airline company; the aircraft manufacturer; the FAA; the insurance company that insures the aircraft; and the insurance company that insures a passenger (life insurance). The system specification and/or requirements may, for example, include: adhering to safety requirements (maintaining the aircraft above stalling speed, ensuring never to reverse thrust in mid-air, ensuring landing gears are out before landing, etc.); adhering to FAA flight vector; ensuring timely response to autopilot parameter adjustments; maximizing fuel efficiency; minimizing flight delay; ensuring a smooth ride; and minimizing emission of greenhouse gases.

The exemplary stake matrix provided in Table 8, illustrates two requirements Safety Record and Timeliness and their corresponding stake as it relates to the various stakeholders identified above.

TABLE 8

Example of the stakes matrix showing requirements.

| | REQUIREMENTS | |
|---|---|---|
| STAKE-HOLDER | $R_1$ - SAFETY RECORD | $R_2$ - TIMELINESS |
| PASSENGERS | Arrive safely | Inconvenience, missed opportunities |
| AIRLINE COMPANY | Reputation with passengers Value 1 | Reputation with passengers Value 2 |
| AIRCRAFT MANUFACTURER | Reputation with passengers Value 3 | Reputation with passengers Value 4 |
| INSURANCE RELATED TO AIRCRAFT | Premium owed for loss of aircraft | Zero |
| INSURANCE RELATED TO PASSANGER | Value of life insurance | Zero |

Entries may be represented as a dollar per unit of time value (or simply as a dollar loss value) such as, for example, dollar per hour ($/hr) or any other metric that can be converted to a dollar per unit of time value.

Each of the correlated items within the stakes matrix may be assigned or associated with a failure cost (FC), as discussed above. The failure cost may be provided by the stakeholder(s) or estimated from historical data in accordance with their stake in the operation of the flight control system. The failure cost may, for example, be obtained or calculated by an insurer specializing in a particular industry, actuarial data, technology, etc.

The exemplary dependency matrix illustrates an exemplary interaction between components of an airliner and the requirements with respect to the passenger or stakeholder. The correlated items within the dependency matrix may be associated with the probability that the component may not satisfy the requirement within a given period of operation of the flight control system.

TABLE 9

Example of the dependency matrix showing requirements and components with respect to passenger. Columns represent individual components within the system of interest, and the entries represent the probably of a system failure as a result of a failure of an individual component to satisfy a given requirement.

| | COMPONENTS | | | | | |
|---|---|---|---|---|---|---|
| REQUIREMENTS | $C_{S1}$ - Stall/Angle of Attack Governor | $C_{S2}$ - Thrust Monitor | $C_{S3}$ - Pilot Landing Intent Monitor | $C_{T4}$ - Departure Scheduler | $C_{T5}$ - Arrival Scheduler | $C_{T6}$ - Reservation Monitor and Re-scheduler |
| SAFETY (WITH RESPECT TO PASSENGER) | Stalling speed 1.00 | Reverse thrust in mid-air 1.00 | Landing gears are not deployed prior to landing 1.00 | 0.00 | 0.00 | 0.00 |
| TIMELINESS (WITH RESPECT TO PASSENGER) | 1.00 | 1.00 | 1.00 | Late departure 0.50 | Late arrival 0.50 | Inability to make connections 1.00 |

Similarly, the exemplary impact matrix illustrates an exemplary interaction between potential threats or vulnerabilities and components of the flight control system and the requirements with respect to the passenger or stakeholder. The correlated items within the impact matrix may be associated with the probability that a given threat will cause a failure of a given component of the flight control system.

TABLE 10

Example of the impact matrix showing threats with respect to components from dependency example with respect to passenger

| | FAULTS/THREATS | | | | | | |
|---|---|---|---|---|---|---|---|
| COMPONENTS | $F_1$ - Hardware failure | $F_2$ - Software failure | $F_3$ - Communication failure | $T_4$ - Security threat type 1: insider | $T_5$ - Security threat type 2: intruder | $T_6$ - Security threat type 3: DOS | No threat |
| $C_{S1}$ - STALL/ANGLE OF ATTACK GOVERNOR | 0.1 | 0.1 | 0.2 | 0.0 | 0.0 | 0.0 | 0.0 |
| $C_{S2}$ - THRUST MONITOR | 0.1 | 0.1 | 0.2 | 0.0 | 0.0 | 0.0 | 0.0 |
| $C_{S3}$ - PILOT LANDING INTENT MONITOR | 0.1 | 0.1 | 0.2 | 0.0 | 0.0 | 0.0 | 0.0 |
| $C_{T4}$ - DEPARTURE SCHEDULER | 0.1 | 0.1 | 0.2 | 0.05 | 0.01 | 0.01 | 0.0 |
| $C_{T5}$ - ARRIVAL SCHEDULER | 0.1 | 0.1 | 0.2 | 0.05 | 0.01 | 0.01 | 0.0 |
| $C_{T6}$ - RESERVATION MONITOR AND RE-SCHEDULER | 0.1 | 0.1 | 0.2 | 0.05 | 0.01 | 0.01 | 0.0 |

The information provided and/or determined via these matrices may, in turn, be processed to render an MFC metric. The MFC metric may then be utilized by, for example, a flight control system architect or designer, an automated control or design system, a control system (operating in real-time or in an offline fashion) or other known analysis systems to identify potential vulnerabilities within the flight control system. These potential vulnerabilities may, in turn, be targeted to specific V&V efforts or other testing and/or security protocols in order to mitigate and or minimize the vulnerabilities associated therewith.

Additional applications (uses) of MFC may include deciding whether it is worthwhile to perform additional V&V actions (including protective measures) on the enterprise system. Exemplary questions that can be addressed by the MFC include whether the V&V action(s) are worthwhile globally; worthwhile individually by stakeholder; determining how to distribute the cost of V&V actions across the community of stakeholders; and how to quantify the benefits of such actions. Thus, by computing the stakeholder return on investment (ROI) (e.g., investment cost to stakeholder as their contribution to the overall V&V cost and their periodic benefit results as a reduction in MFC), the stakeholder net present value (NPV) may be computed. The sum of all stakeholders' NPV is the global NPV. The global ROI is computed as the global NPV divided by the global V&V cost. In this way, V&V costs can be fairly distributed across the community of stakeholders as either (1) proportional to their respective MFC reduction, or (2) using a strategy that all stakeholders ROI's are identical.

VI. Second Exemplary Utilization of an MFC Metric

Figure 5:
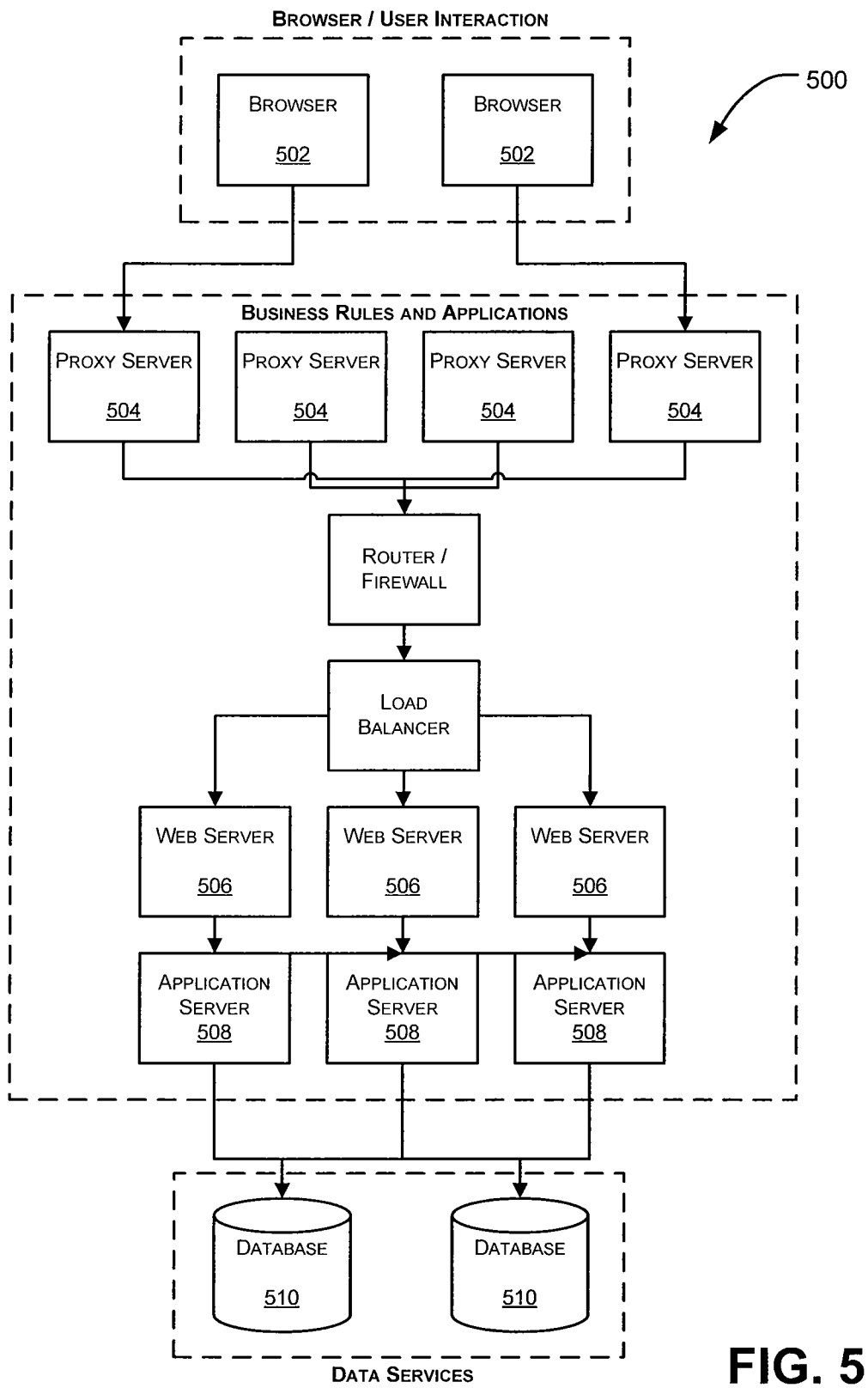
FIG. 5 is a network or system that may be analyzed utilizing an MFC-based control scheme.

FIG. 5 illustrates an exemplary e-commerce system 500 that may be analyzed utilizing the MFC metric. In particular, the e-commerce system 500, and properties of the e-commerce system 500, may be evaluated to derive the (3) three matrices.

Stakes Matrix

One matrix to be constructed and analyzed is the stakes matrix in which the security requirements are identified, and then the stakeholders and their stakes in meeting or satisfying these requirements are determined.

Security Requirements

The exemplary e-commerce system 500 may include or otherwise be associated with the following security requirements: (1) confidentiality to ensure that data is accessible only to authorized users; (2) integrity to ensure that information that is displayed or transmitted has not been altered by unauthorized parties or users; (3) availability to ensure that the e-commerce application is operational when a user accesses the system; (4) non-repudiation to ensure that no party in an operation can deny participating in the operation; (5) authenticity to ensure that all users or parties in a system are properly authenticated, and their privileges and responsibilities defined accordingly; and (6) privacy to ensure that information pertaining to system users is not improperly divulged.

Stakes and Stakeholders

The exemplary e-commerce system 500 may be accessed or utilized by a number of stakeholders, including: (I) the user or customer; (II) the merchant; (III) the technical intermediary, and (IV) the financial intermediary. Each stakeholder has a stake in the satisfaction of the security requirements, and these stakes, in turn, may be processed to determine corresponding values in the stakes matrix. For example, (I) the user or customer may have a stake in the secure operation of the e-commerce system 500 that may include: the loss of confidential information which the customer may provide during the e-commerce transaction; transaction failure; identity theft. (II) The merchant may have a stake in the secure operation of the e-commerce system 500 that may include: the loss of business that may result from failing the availability requirement; the loss of customer loyalty that may result from failing the availability requirement; the loss of customer loyalty that may result from failing the confidentiality or the privacy requirements; and the loss of business that may result from failing the integrity requirement. (III) The technical intermediary may have a stake in the secure operation of the e-commerce system 500 that may include: the loss of business from the merchant; the loss of reputation for good service which may, in turn, result in lost corporate value. (IV) The financial intermediary may have a stake in the secure operation of the e-commerce system 500 that may include: financial losses that result from malicious activities by customers; the loss of business from the merchant; the loss of reputation for good service which may result in lost corporate value.

Based on a quantification of these stakes in terms of dollars per hours of operation (under the hypothesis that the system fails to meet each security requirement), the stakes matrix shown in Table 11 provides the following relationships:

506 may be multithreaded, utilizing a pool of threads, each of which may be dispatched to handle an incoming request. Multithreaded web servers 506 may be less susceptible to bottlenecks (and hence long latency) when a number of long-running HTTP or HTTPS requests (such as credit card validation) arrive because other threads in the pool are still available to serve incoming requests. Upon analyzing the request, the web server 506 sends it to one or more application servers 508 that respond using the service of one or more databases 510.

Application Servers

From the web server the HTTP or HTTPS requests may be forwarded to the application servers 508. The application servers 508 may run in the middle business rules and application architecture. The application servers 508 implement business logic and connectivity, which may dictate how clients and servers interact.

Database Servers

The request for service may be served by the database 510, which may process a request for an instruction by adding, modifying, or retrieving information. The relation database

TABLE 11

An example of a Stakes matrix for the exemplary e-commerce system 500
(Stakes in $/Hour)

| | | SECURITY REQUIREMENTS | | | | | |
|---|---|---|---|---|---|---|---|
| STAKES MATRIX | | CONFIDENTIALITY | INTEGRITY | AVAILABILITY | NON-REPUDIATION | AUTHENTICITY | PRIVACY |
| STAKEHOLDERS | CUSTOMER | 10 | 5 | 3 | 4 | 6 | 12 |
| | MERCHANT | 120 | 70 | 140 | 110 | 105 | 6 |
| | TECHNICAL INTERMEDIARY | 20 | 20 | 40 | 20 | 30 | 20 |
| | FINANCIAL INTERMEDIARY | 20 | 60 | 50 | 40 | 40 | 60 |

The Dependency Matrix

As previously discussed, the dependency matrix, shown in Table 12, represents how (to what extent) security requirements are dependent on the proper operation of system components. In order to derive this matrix, the architecture of the exemplary e-commerce system 500 is evaluated.

Web Browser

The end user may interact with the exemplary e-commerce system 500 through one or more web browsers 502. Web browsers 502 may support user interface modifiability in a many ways. It may interface content through a web based protocol such as HTML.

Proxy Servers

Requests from individual browsers 502 may be received by one or more proxy servers 504, which may improve the performance of the web-based system. Proxy servers 504 may cache frequently accessed web pages so that users may retrieve them without having to access the main web site. However, if a user chooses a particular item, with the intention of bidding or selling, then the user must be shown real-time data. Proxy servers 504 may be located close to the users, often on the same network, thus saving a tremendous amount of communication and computation resources.

Web Servers

A web based protocol such as HTTP or HTTPS may convey requests to one or more web servers 506. The web servers management system (RDBMS) may support some or all incoming requests from the application servers.

Generation of the Dependency Matrix

To estimate the probability that a particular security requirement is violated in the course of operating the e-commerce system 500 may be rendered by an analysis. The analysis may link the probability of failing a particular requirement with the probability of failure of a component of the system. The elucidation of this probabilistic link may include an analysis of the system's architecture to determine which component contributes to meeting which requirement.

If it is assumed that components of the same type play interchangeable roles, t individual components in the dependability matrix may not be represented; it suffices to represent families of components. An analysis may consider one or more of the following (families of) components: (a) browser; (b) proxy server; (c) router/firewall; (d) load balancer; (e) web server; (f) application server; and/or (g) database server.

Assuming no more than one component fails at a time, and considering the additional event that no component has failed, the dependability matrix has (7+1=)8 columns and 6 rows (one for each security requirement), for a total of 48 entries. A sample of the reasoning that goes into filling the dependability matrix is shown below.

TABLE 12

An example of a Dependency matrix for the exemplary e-commerce system 500

| DEPENDENCY MATRIX | | BROWSER | PROXY SERVER | ROUTER/ FIREWALL | LOAD BALANCER | WEB SERVER | APPL. SERVER | DATABASE SERVER | NO FAILURE |
|---|---|---|---|---|---|---|---|---|---|
| SECURITY REQUIREMENTS | CONF | 0.2 | 0.2 | 1.0 | 1.0 | 0.333 | 0.333 | 0.5 | 0.0 |
| | INT | 0.2 | 0.2 | 1.0 | 1.0 | 0.333 | 0.333 | 0.0 | 0.0 |
| | AVAIL | 1.0 | 1.0 | 1.0 | 1.0 | 0.333 | 0.333 | 0.0 | 0.0 |
| | NR | 0.2 | 0.2 | 1.0 | 1.0 | 0.333 | 0.333 | 0.0 | 0.0 |
| | AUTH | 0.2 | 0.2 | 1.0 | 1.0 | 0.333 | 0.333 | 0.5 | 0.0 |
| | PRIV | 0.2 | 0.2 | 1.0 | 1.0 | 0.333 | 0.333 | 0.5 | 0.0 |

If no component fails, then (presumably) all security requirements are satisfied. If one of the database components fails, its failure may not affect the availability of the system; loss of a database server may affect response time, but not necessarily availability. Assuming confidential information is stored in only one database (for enhanced protection), then failure of a database server may cause a failure with respect to confidentiality, authentication and privacy with probability of about 0.5. If a browser fails then availability is not satisfied. If a proxy server fails, then availability is not satisfied. If the router/firewall fails no dimension of security may be satisfied. If a web server fails then all the dimensions of security have probability of about 0.33 to fail (all the queries that are routed to that server lead to unpredictable outcomes). If the router is assumed to check when a web server fails, then these probabilities would be 0.0.

The Impact Matrix

The impact matrix relates component failures to security threats or vulnerabilities; specifically, it represents the probability of failure of components given that some security threat (from a pre-catalogued set) has materialized. The first step in deriving the impact matrix is the derivation of the set of threats or vulnerabilities that we wish to consider; this is akin to defining a fault model (including a set of possible faults) in the analysis of the reliability of a system.

Threats or Vulnerabilities on Communication Protocols

This category of threats or vulnerabilities exploits the weaknesses of the basic protocols of internet such as TCP/IP, HTTP, FTP, for example. The main lines of this type of attacks are: (i) attacks to make inalienable the server; (ii) the listening of the communications; (iii) The replacement and the manipulation of data; and (iv) the use of the not foreseen protocols or the diversion of protocols.

Threats or Vulnerabilities on the Systems and the Standard Applications

This category may include the attacks that exploit the weaknesses at the level of the standard applications of the server. This problem may be supported by the standardization of operating systems (UNIX, NT,) and standard applications of communication (SMTP e-mailer, browser using HTTP or still use of SQL for databases). The different possibilities of attacks included in this category may include: (i) attacks on unused or weakly protected network services; (ii) attacks on the availability of the service by use of application bugs or vulnerabilities; and (iii) attacks aiming at accessing the computer systems of the company.

Threats or Vulnerabilities on the Information

This type of threats or vulnerabilities may be used to obtain a profit or even to introduce false information on the site to affect the brand image of the company. There may be several forms of attacks including: (i) attacks in the availability of the site by saturation or manipulation of the information; (ii) attacks aiming at the illegal appropriation of information on the site; (iii) the hostile modifications of the information displayed on a site to dis-inform the customers and to compromise the responsibility of the company; and (iv) the modifications of contents of transaction.

The Passive Listening

An attack may be initiated via passive listening (or sniffing) communications of a network to try to obtain authentication information such as user login and the password information. The authentication information may be utilized to connect to the server in the place of the real authenticated user.

Virus

The infection of the server by a virus can results in its total or partial unavailability. But more serious still is the fact that the server may propagate the virus to system users.

Trojan

The Trojan horse, also known as trojan, in the context of computing and software, describes a class of computer threats or vulnerabilities that appears to perform a desirable function but in fact performs undisclosed malicious functions that allow unauthorized access to the host machine, giving them the ability to save their files on the user's computer or even watch the user's screen and control the computer. Trojan horse payloads may be designed to cause harm, but may also be harmless. They are classified based on how they breach and damage systems. Six types of trojan horse payloads may provide: (a) remote access; (b) data destruction; (c) downloader/dropper; (d) server trojan (Proxy, FTP, IRC, Email, HTTP/HTTPS, etc.); (e) disable security software; and (f) denial-of-service attack (DoS).

Denial-of-Service and DDoS

A denial-of-service attack (DoS attack) or distributed denial-of-service attack (DDoS attack) is an attempt to render a computer resource unavailable. A DoS attack can be perpetrated in a number of ways. The five basic types of attack may include: (i) consumption of computational resources, such as bandwidth, disk space, or processor time; (ii) disruption of configuration information such as routing information; (iii) disruption of state information, such as unsolicited resetting of TCP sessions; (iv) disruption of physical network components; and (v) obstructing the communication media between the intended users and the victim so that they can no longer communicate adequately.

Threats or Vulnerabilities on the Database

One of the possible attacks has for principle to modify indirectly the SQL orders sent to the server, by including special character strings instead of the parameters there waited by the application software. This technique allows for the retrieval of confidential information from the database. We can make for example a normal call such as for example:

http://server/prog? User=name_user. We can then make a call falsified by the type: http://server/prog? User=other_user. Utilizing this technique, either information concerning the other user may be directly obtained, or an error which provides indications which allows an intruder to learn, for example, that the name to use is a parameter identifying a matrix and that there is a matrix of user.

Generating the Impact Matrix

Given the cataloged 8 security threats or vulnerabilities, the impact matrix shown in Table 13 will have 9 columns, one for each threat plus 1 for the absence of threats or vulnerabilities. On the other hand, it has 8 rows, 1 for each component plus one for the event that no component has failed during the unitary time period.

TABLE 13

Impact matrix for the exemplary e-commerce system 500

| IMPACT MATRIX | | THREATS OR VULNERABILITIES | | | | | | | |
|---|---|---|---|---|---|---|---|---|---|
| | | COMM | SYS | INFO | LIST | VIRUS | TROJ | DOS | DB | NOT |
| COMPONENTS | BRWS | 0.0 | 0.1 | 0.1 | 0.1 | 0.3 | 0.4 | 0.2 | 0.0 | 0.0 |
| | PROX | 0.5 | 0.1 | 0.1 | 0.3 | 0.3 | 0.4 | 0.2 | 0.0 | 0.0 |
| | R/FW | 0.5 | 0.1 | 0.1 | 0.3 | 0.3 | 0.4 | 0.6 | 0.0 | 0.0 |
| | LB | 0.0 | 0.1 | 0.1 | 0.1 | 0.3 | 0.4 | 0.6 | 0.0 | 0.0 |
| | WS | 0.0 | 0.6 | 0.6 | 0.2 | 0.3 | 0.4 | 0.2 | 0.0 | 0.0 |
| | AS | 0.0 | 0.1 | 0.1 | 0.1 | 0.3 | 0.4 | 0.2 | 0.0 | 0.0 |
| | DBS | 0.0 | 0.1 | 0.1 | 0.0 | 0.5 | 0.6 | 0.3 | 0.8 | 0.0 |
| | NOF | 0.4 | 0.3 | 0.1 | 0.1 | 0.05 | 0.05 | 0.1 | 0.2 | 1.0 |

The absence of threats or vulnerabilities does not cause the failure of any component, and leads to event NoF (no failure) with probability 1.0. A process may estimate that threats or vulnerabilities to the database cause a failure of the database with probability 0.8, say, to make provisions for the case where an attack fails to achieve its goal; they may cause event NoF (no failure) with probability 0.2. The process may assume that because the database component is the only target of this threat, the probability that it causes a failure of any other component is 0.0. Generally, the row labeled NoF represents the probability of failure of each threat, e.g., the probability that it does not cause any component to fail. The threat on communication protocol (Comm) targets the proxy servers and the routers; the process may assume that the probability that it causes a failure of the other components is 0.0. A virus may have some likelihood of affecting any component of the system, through propagation. A Trojan horse may have some likelihood of targeting any component of the system, through propagation. The threat passive listening targets primarily the components that are involved with communication. The denial of service attacks (DoS) may target the bottlenecks of the architecture, for maximal effect.

Threat Configuration

Vector PV characterizes the threat situation by assigning to each category of threats or vulnerabilities, shown in Table 14, the probability that this threat will materialize over a unitary period of operation (say, about an hour). The process may assume that no more than one threat can materialize within a unitary period of time, and we make provisions for the case where no threat does materialize. Hence this vector contains a probability distribution of complementary events. The process may assume that in light of log data, known vulnerabilities, and known perpetrator behavior, the process determines that the threats or vulnerabilities have the probability indicated below.

TABLE 14

Threat Matrix shows the probability that a threat will materialize during a given period

| THREAT PROBABILITY (PT) | | PROBABILITY |
|---|---|---|
| THREATS OR VULNERABILITIES | Comm | 0.01 |
| | Sys | 0.02 |
| | Info | 0.01 |
| | List | 0.01 |
| | Virus | 0.03 |
| | Troj | 0.06 |
| | DoS | 0.03 |

TABLE 14-continued

Threat Matrix shows the probability that a threat will materialize during a given period

| THREAT PROBABILITY (PT) | PROBABILITY |
|---|---|
| DB | 0.02 |
| NoT | 0.81 |

Using this data, the process computes the vector of mean failure costs, using the formula $$MFC = ST \cdot DP \cdot IM \cdot PT.$$

Substituting each matrix by its value, the process renders:

| STAKEHOLDERS | MEAN FAILURE COST $/HOUR |
|---|---|
| CUSTOMER | $ 7.02 |
| MERCHANT | $112.97 |
| TECHNICAL INTERMEDIARY | $ 31.16 |
| FINANCIAL INTERMEDIARY | $ 51.27 |

Return on Investment

From the standpoint of each stakeholder, the mean failure cost (which is the cost the process expects to incur as a result of the lack of security) must be balanced against the cost of improving system security. The mean failure cost (MFC) model allows for the determination of the tradeoff of quality versus cost in terms of a return on investment equation. Specifically, a return on investment (ROI) model is defined by the following parameters: An initial investment cost, say IC; an investment cycle (duration), say T; a return over the investment cycle, say B(t), for 1≤t≤T, and a discount rate, say d. Then the return on investment is given by the following formula:

$$ROI = -1 + \sum_{t=1}^{T} \frac{B(t)}{IC \times (1+d)^t}$$

This example illustrates the application of the CSES/MFC model for estimating system security. The quantification of security attributes by means of costs to stakeholders opens a wide range of possibilities for further economics based analysis, and provides a valuable resource for rational decision making.

The CSES/MFC model creates several matrices that may represent various types of entities. These include: a stakeholder-requirement matrix that monetizes costs for when a requirement fails; a requirement-component matrix that represents the conditional probability of the requirement failing given that a component of the system fails; a component-threat matrix that represents the conditional probability of a component failing given that a particular threat materializes (e.g., vulnerability exists and is exploited by the threatening system, process, or actor); and a threat-mitigation matrix that represents the probability of a threat existing given that a particular mitigation (or set of mitigations, a.k.a. a risk posture) is in place. The matrices may describe independent and/or dependent events. Two events are dependent if the probability of one event is altered by knowing whether the second event occurred.

A matrix product of the matrices described above has many uses. It may be used for sensitivity analysis (e.g., to assess expert opinions, to rank/prioritize threats or vulnerabilities), to search for areas of weakness (e.g., a component that could be hardened against a threat and would yield considerable cost reductions), and to determine non-critical entities (e.g., a component whose security against threats or vulnerabilities has little or no implications for the cost to stakeholders). In some applications, the resulting product of matrices will render a matrix with rows indexed by stakeholders and columns indexed by mitigations. The entries of the resultant matrix may comprise the expected costs to each stakeholder for that mitigation. This may follow from the nature of the conditional probabilities and may allow decision-makers to determine which mitigation to use.

In some applications, other matrix products may also be relevant. In particular, there may be interest in knowing the dependence of the results on a particular entry of the component-threat matrix. The effect of that entry on the stakeholder mitigation product matrix may be computed by replacing the component-threat matrix with a matrix of all zeros except for a single one at the entry of interest. The resulting product provides the matrix of derivatives of each matrix product entry with respect to the component-threat entry of interest.

The underlying assumptions of the matrix product may be understood as a product of conditional probabilities as shown:

$$P(A_1|A_2)P(A_2|A_3)\ldots P(A_{n-1}|A_n) = P(A_1 A_2 \ldots A_{n-1}|A_n)$$

The expression indicates that the events are conditionally independent. That is, An depends on A1 only through the influence of An−1. This assumes that the probabilities of different matrices are independent (e.g., assumption one). For example, the probability of a component failing given the presence of a threat does not depend on which requirement that component is serving, or on the mitigation that is in place (since the threat is already assumed to be present).

A second assumption may assume that entities in each class (other than stakeholders) correspond to disjoint events meaning if two components can fail independently (e.g., neither, either one, or both can fail) then the two component failures are not disjoint. In practice, the second assumption applies to the summation of terms within a matrix product. Generally, $$P(A_1|A_n) = \sum_{a_2,a_3,\ldots a_{n-1}} P(A_1, A_2=a_2, A_3=a_3, \ldots, A_{n-1}=a_{n-1}|A_n)$$

as long as the joint events, each one described by the set of values a2, a3, . . . , an−1, are disjoint. Otherwise, alternative embodiments of the equation may require correction factors for intersections of events.

To address dependence, the original sets of requirements, components, threats or vulnerabilities, and mitigations that comprise the matrices may be replaced by all of their possible combinations. However, the structural relationships and quantitative comparisons between events may be used to simplify the interpretation and the populating of the model parameters.

If a system contains components A, B, and C, then there are eight possible component failure states based on the eight subsets of (A, B, C) that may fail. In this application the original sets of the requirements, components, threats or vulnerabilities, and mitigations are replaced by all of their possible combinations. The resulting matrices, while being exponentially larger, will (by definition) satisfy the assumption that entities in each class (other than stakeholders) correspond to disjoint events.

When calculating the matrix products, such as the n1×n3 product of an n1×n2 matrix with an n2×n3 matrix, the matrix product may be computed in work through complexity shown as O(n1n2n3). For a product of four matrices, the work becomes O(n1n2n3+n1n3n4) or O(n2n3n4+n1n2n4), depending on the order of operations.

In some applications, the system may exploit the structural properties of the matrices through processes that take advantage of the large number of zero elements. If a matrix is sparse it will contains enough zero entries that a sparse factorization process may reduce both the storage and work required in solving the linear system.

In some applications interpretation of the resulting matrices may be facilitated though a triage system (e.g., a processor based system) or a triage process that applies triage rules (e.g., rule-based program) through one or more utility programs. A triage rule may reduce the number of mitigations that need to be processed. If the mitigation costs are estimated, the triage utility may eliminate all mitigations that exceed a predetermined threshold or are too costly. If there are unacceptably high costs to certain stakeholders, the triage utility may eliminate the mitigations resulting in those high costs too by a comparison to a second threshold. Also, if two mitigations are such that one of the mitigations is both cheaper to implement and costs less to the stakeholders (this is many simultaneous conditions), then the other mitigation can be reduced or filtered out. Through the use of stakeholder utility programs the systems and processes may filter the matrix entries and account for specific or arbitrary stakeholder concerns.

To further reduce the complexity of the systems and processes the matrices may be populated through Bayesian belief networks. The Bayesian belief networks may comprise compact networks that capture the probabilistic relationships between variables as well as historical information about their relationships. The Bayesian belief networks are effective for modeling situations where some information is known and incoming data is uncertain or partially available.

In some applications the systems and/or methods capture structural (conditional) dependencies. An exemplary Bayesian belief network may comprise a probability model that efficiently captures the potentially highly complex relationships between variables by "factoring" them as conditional dependencies. For example, a collection of variables $X_1, X_2, \ldots, X_k$ may be given with dependencies of the form $Xi \rightarrow Xj$. This may be interpreted as saying that the variable Xj depends directly on all Xi such that $Xi \rightarrow Xj$. These dependencies may define a directed acyclic graph.

The Bayesian belief network model may also specify the distribution of Xj given all the Xi on which it directly depends. In those applications in which it is sufficient to consider only categorical variables, the distributions can be stored in look-up tables or databases resident to a nonvolatile or volatile memory. The rows of the table may be indexed by all combinations of values of the input variables (e.g., the Xi), and the value in the table that may comprise the probability may be expressed as $$P(X_j=x_j|X_{i1}=x_{i1}, \ldots, X_{ik}=X_{ik}).$$

Additional dependencies may exist in a Bayesian belief network in cases where, say, $Xi \rightarrow Xj$ and $Xj \rightarrow Xk$. However, the dependencies may be accounted for with the tables already described by factoring through other variables as needed. The conditional independence of the system and/or process means that the probability of Xj is independent of all Xi that it is not directly dependent on, given the values of the Xi that it is dependent on. This means that a relatively small number of parameters may be needed to fully describe the joint probability distribution of all of the variables. This efficiency is especially pronounced when the dependencies $Xi \rightarrow Xj$ are a sparse set among the set of all variables. Given the joint distribution, it is then possible for the system or expert system to perform various types of inferences, to learn the tables from data (e.g., called training), to compute the probability of various types of events, to synthesize (e.g., simulate) data, and to compare multiple hypotheses for the same data.

In some systems, a scheme for efficiently populating the matrices devise a Bayesian belief network for the events in which expert systems create the conditional probabilities. The systems and methods may have an advantage over directly populating a matrix with probabilities because it enforces a high degree of consistency. The Bayesian belief network makes this accounting explicit and, therefore, consistent. Furthermore, it is more efficient, especially for sparse Bayesian belief networks, which have relatively few dependencies. Consider for example a two component model. The two components may comprise a gate and a pump (stored behind the gate). Consider a physical threat against the pump that must first defeat the gate. The probability of defeating the gate can be estimated. The conditional probability distribution of sabotaging the pump given that: 1. the gate was defeated, or 2. the gate was not defeated may also be estimated. Based on these circumstances the four cases may be computed given only three numbers. (These are the probability of success against the gate and the two conditional probabilities against the pump given the result of the gate action.). If there were a sequence of k gates, the system may derive only one probability for the first gate, and two probabilities for each subsequent gate and the pump. The original requirement for $2^{(k+1)}$ probabilities is therefore reduced to $2k+1$ probabilities. In larger, more complex cases the reduction in estimated values may be far more dramatic.

Figure 6:
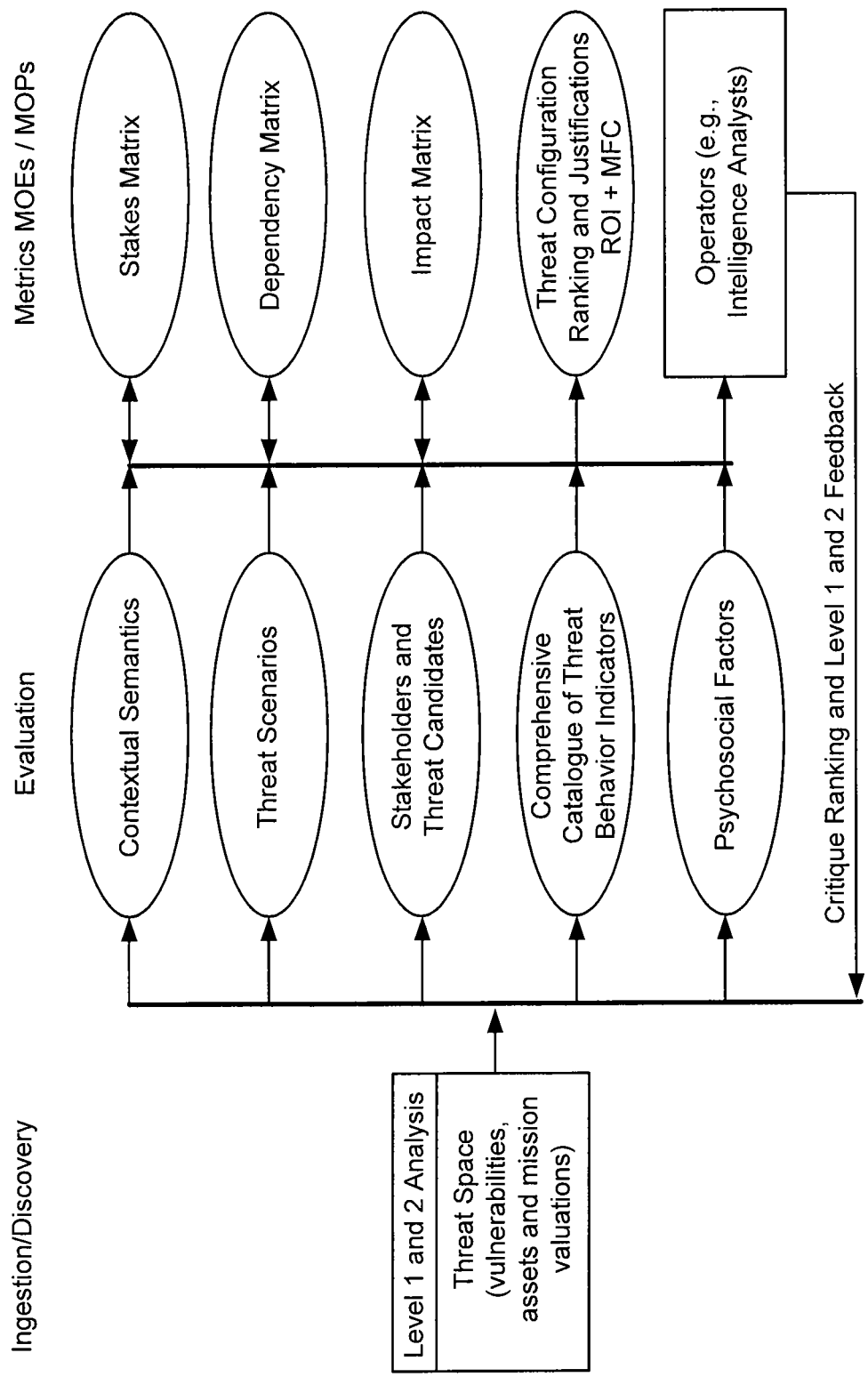
FIG. 6 is a ranking of emerging threats or vulnerabilities.

To better assess the threats or vulnerabilities, an automated or semi-automated discovery may be executed within the CSES framework. Conceptually, the use of CSES for ranking and justifying emerging threats or vulnerabilities is shown in FIG. 6. The threat space and vulnerability may be identified through an external interface. A web site, for example, may provide access to historical records of known threats or vulnerabilities that may serve as a basis for predicting vulnerabilities and emerging threats. The threat candidates may be subject to an assessment that provides the terms that may populate the measures of performance and measures of effectiveness. The net effect is the cost of the threats or vulnerabilities should they emerge may be quantified and a ranking generated based on failure cost.

As shown, a threat candidate may be ranked through a contextual semantic assessment. Contextual semantics may refer to the types of semantic information that may be inferred about words, objects, or concepts by the contexts the concepts appear in, for example. A contextual semantics assessment engine may assess and in some instances automatically rate the meaning of a threat because threats or vulnerabilities that appear in the same context may share common contextual features. For example, a contextual assessment may assess when a threat candidate develops or occurs. In a power distribution system, for example, a denial of service at a generator may result in a more significant threat (and therefore, may have a more significant effect) than if the denial of service occurred at single point of distribution (e.g., such as at a customer's meter), because it may affect a larger population. A contextual semantic assessment would identify the denial of service and assess its effect.

Threat candidates may also be assessed through threat scenarios (use of modeling to identify relevant threats or vulnerabilities) engines and predetermined criteria established by the defenders (e.g., the stakeholders) and known threat candidates. Historical records of known threats or vulnerabilities may also be used to identify the likelihood of a threat emerging just as factors that affect a person psychologically or socially. This is shown by the psychosocial assessment engine that recognizes that while each threat may be different, some share common features and manifestations when the threat emerges.

Utilizing the previous described matrices, the stakes matrix is filled according to the predetermined stakes the stakeholders have in satisfying individual requirements; the dependency matrix is filled (e.g., through a cyber-operation or through a processor, for example) according to how each component contributes to meet each requirement; the impact matrix may be filled using machine learning techniques according to how each component is affected by each threat. Empirical data may be processed by a knowledge base engine and/or inference engine to fill the vector of threat emergences probabilities (PV) that represents the probability of emergence of the various threats or vulnerabilities that are under consideration. Empirical validation of the values of PV may occur by continually monitoring data sensors in relation to the assets at risk, countermeasures and concomitant impacts if compromised. This may results in a vector of mean failure costs of all stakeholders that may be represented as $$MFC = ST \cdot DP \cdot IM \cdot PV.$$

Over an operational period the number of threats or vulnerabilities that have emerged may be estimated and may be continuously refined in real-time or near real-time as shown in FIG. 7 as the autonomous system continuously evaluates risks and gains precision. A real-time operation may comprise an operation matching a human's perception of time or a virtual process that is processed at the same rate (or perceived to be at the same rate) as a physical or an external process. On this basis, the system(s) or process(es) may infer the probability of emergence of some or all the threats or vulnerabilities during operation, and in-turn, may develop an active response for one or more threats that are ranked highly, and in turn, deploy one or more responses or reactions in real-time (or near real-time). When threats occur or responses are deployed the systems and processes may provide real-time alerts for stakeholders, mobile users, etc. The alert may comprise a short message service, an email feature, tactile feedback, or other functionality that sends voice, graphics, and/or textual messages (e.g., audio, visual, vibration) to the users. The alert may be accompanied by threat or mitigation details, contact information, and/or other data and information.

The practicality and utility of the described systems and processes may be further shown when applied to a simplified model of the Fukushima Daiichi ("Fukushima") nuclear disaster. A series of equipment failures, nuclear meltdowns, and radioactive contaminations occurred at the Fukushima I nuclear power plant following the magnitude 9, Mar. 11, 2011 earthquake off the Pacific coast of Tōhoku. As shown, a simplified model of the mean failure cost for stakeholders may be represented by (MFC=ST·DP·IM·PV)

| Stakeholder | Cost per Day (USD) |
| --- | --- |
| Power Generator (Producer) | 66,103.75 |
| Power Consumer (Plant Ops) | 53,518.15 |
| Industry Customer | 481.775 |
| Household Customer | 0.176904 |
| Utility Distribution | 2,908.15 |

For the stakeholders, the systems and/or processes identify: a) the power generator (producer), which includes the loss of income due to plant destruction; b) power consumer (plant ops.), which includes loss of plant operations due to the lack of power; c) industry customer, which loses revenue due to loss of power; household customer, which loses consumables due to loss of power; and utility distribution, which loses revenue due to loss of power.

It represents the probability of failure of components given that a specific threat has materialized. And, the vector PV table characterizes the threat by assigning to each threat category the probability that the threat will materialize over a one day period.

While this example is illustrative of the technique of using CSES to understand the mean failure cost of a loss that may have been experienced at the Fukushima I nuclear power plant it is not nor is it intended to be exhaustive. As shown, the stakes matrix quantifies the variable in terms of financial loss per unit of operation time (e.g., $/hour); it represents the loss of service that the stakeholder may have experienced as a result of the failure.

|  |  | Requirements | | | |
| --- | --- | --- | --- | --- | --- |
| ST | | Produce Reliable Power | Safety Compliance | Consume Power | Distribute Power |
| Stakeholders | Power Generator (Producer) | 5,486,335 | 50,000 | 0 | 0 |
| | Power Consumer (Plant Ops) | 0 | 10,000 | 3,380,000 | 0 |
| | Industry Customer | 0 | 5,000 | 2,1600 | 0 |
| | Household Customer | 0 | 0 | 11.232 | 0 |
| | Utility Distribution | 0 | 10,000 | 0 | 500,000 |

The dependency matrix assesses the architecture of the system in light of the role that each of the recited components of the architecture plays to achieve each goal. Whether a particular requirement is met or not may conceivably depend on which component of the system architecture is operational. In highly complex systems these operational components that play to achieve each system goal may be rolled up in a hierarchical process that may simplify the analysis and computations.

| | | Components | | | | | |
| --- | --- | --- | --- | --- | --- | --- | --- |
| DP | | Line Power (Grid) | Backup Power (Generators) | Line Power & Backup Power | Electronic Controls | Cooling Systems | No Failure |
| Requirements | Produce Reliable Power | 0.1 | 0.01 | 0.001 | 0.01 | 0.01 | 0 |
| | Safety Compliance | 0.1 | 0.2 | 0.02 | 0.1 | 0.1 | 0 |
| | Consume Power | 0.15 | 0 | 0 | 0 | 0 | 0 |
| | Distribute Power | 0.05 | 0 | 0 | 0 | 0 | 0 |

The stakes matrix identifies the cost in US Dollars per day of operation if the system fails to meet its requirements. The dependency matrix represents how the requirements are dependent upon the proper operation of individual components of the overall power plant system. The impact matrix relates component failures to threats seen at the power plant.

The impact matrix specifies the catalog of threats or vulnerabilities that may have been experienced at the Fukushima I nuclear power plant. In this example, it comprises a subset of the catalog of threats or vulnerabilities. In some ways, the impact matrix represents a fault model that catalogs the threats or vulnerabilities that the nuclear plant faced.

|  | IM | Threats or vulnerabilities | | |
|---|---|---|---|---|
|  |  | Earthquake | Tsunami | No Threat |
| Components | Line Power (Grid) | 0.45 | 0.3 | 0 |
|  | Backup Power (Generators) | 0.05 | 0.75 | 0 |
|  | Line Power & Backup Power | 0.0225 | 0.225 | 0 |
|  | Electronic Controls | 0.05 | 0.75 | 0 |
|  | Cooling Systems | 0.1 | 0.25 | 0 |
|  | No Failure | 0.75 | 0.3 | 1 |

The vector of mean failure costs (MFC) of the recited stakeholders may be represented as:

| Vector PT Providing Threat Probability | |
|---|---|
| Threats or vulnerabilities | Probability |
| Earthquake | 0.20 |
| Tsunami | 0.05 |
| No Threat | 0.75 | which shows the probability of emergence of a subset of threats during the plants operation.

The processes and descriptions described within this disclosure may be programmed in one or more servers or may be encoded in a non-transitory signal bearing medium, a computer readable medium such as a memory that may comprise unitary or separate logic, programmed within a device such as one or more integrated circuits, retained in memory and/or processed by a controller or a computer. If the methods are performed through software, the software or logic may reside in a physical memory resident to or interfaced to one or more processors or controllers that may support a tangible communication interface, wireless communication interface, or a wireless system. The memory may include an ordered listing of executable instructions for implementing logical functions. A logical function may be implemented through digital circuitry, through source code, or through analog circuitry. The software may be embodied in any non-transitory computer-readable medium or signal-bearing medium, for use by, or in connection with an instruction executable system, apparatus, and device, resident in system that may maintain a persistent or non-persistent connection with two or more systems or an intermediary that may convey data to more than one insurance sources.

Such a system may include a computer-based system, a processor-containing system, or another system that includes an input and output interface that may communicate with a publicly accessible distributed network through a wireless or tangible communication bus through a public and/or proprietary protocol and may respond to commands, events, actions, and/or requests. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

A "computer-readable medium," "machine-readable medium," "propagated-signal" medium, and/or "signal-bearing medium" may comprise any non-transitory medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Other alternative systems may be implemented with any combination of structures and/or functions described above or shown in the figures. These systems are formed from any combination of structure and function described above or illustrated within the figures. Besides what is described, logic may be implemented in hardware. The hardware may include a processor or a controller in communication with a volatile and/or non-volatile memory that interfaces peripheral devices through a wireless or a tangible medium. An engine may comprise a processor or a portion of a program retained in a non-transitory medium and executed by a processor that determines how the program manages and manipulates data. For example, an inference engine may comprise a portion of a system, such as an expert system, that matches or relates input with facts and rules contained in a knowledge database retained in a memory to derive conclusions or actions, on which the system may act. The knowledge database may comprise files composed of records, each of which contains fields together with a set of operations for searching, sorting, recombining, and other functions that are retained in a memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An econometrics-based control system comprising:
 a processor;
 a memory in communication with the processor, the memory configured to store processor implementable instructions, where the processor implementable instructions are programmed to:
 generate a stakes matrix that associates a failure cost to each of one or more system requirements, for each of at least one stakeholder, wherein each failure cost is associated with a monetary value;
 generate a dependency matrix that links at least one system component with a probability of failure for each of the one or more system requirements in instances when the corresponding system requirement failure occurs;
 generate an impact matrix to link a possible threat with each of the at least one system component;
 determine a mean failure cost based on a matrix multiplicative product of, at least, the stakes matrix, the dependency matrix, and the impact matrix, wherein the mean failure cost for a particular stakeholder represents a weighted sum in which:
the one or more failure costs for the particular stakeholder, wherein each of the failure costs is associated with one of the one or more system requirements, is weighted by a probability of failure of the associated system requirement, and all of the weighted failure costs for the particular stakeholder, are summed; and
analyze the mean failure cost to determine a control strategy; and
a communication component in communication with the processor and the memory, the communication component configured to communicate the control strategy to a controller component operable within the control system, where the controller component implements the control strategy.

2. The econometrics-based control system of claim 1 where the processor implementable instructions are programmed to:
generate a mitigation matrix that links each of the one or more system requirements with a mitigation cost associated with each of the at least one system component.

3. The econometrics-based control system of claim 1, where the processor implementable instructions are programmed to:
initialize an interface engine configured to system information related to the generated matrices.

4. The econometrics-based control system of claim 1 where the control strategy comprises rendering a resource allocation schedule.

5. The econometrics-based control system of claim 1 where the impact matrix is derived from empirical data.

6. The econometrics-based control system of claim 1 where the stakes matrix, dependency matrix, and impact matrix are generated in real-time.

7. The econometrics-based control system of claim 1 where the processor is programmed to execute a sparse factorization on the stakes matrix, the dependency matrix, and the impact matrix.

8. The econometrics-based control system of claim 1 where the processor is programmed to execute a triage process that reduces the stakes matrix, the dependency matrix, and the impact matrix.

9. The econometrics-based control system of claim 1 where the processor is programmed to assess and rank threats or vulnerabilities.

10. The econometrics-based control system of claim 9 where the processor is programmed to assess and rank the threats or the vulnerabilities based on a contextual semantic assessment, a threat modeling assessment, and a threat scenario assessment.

11. The econometrics-based control system of claim 1, wherein the dependency matrix is generated through a Bayesian belief network.

12. The econometrics-based control system of claim 1, wherein the impact matrix is utilized to determine the probability of each system component failure based on an evaluation of one or both of:
a protection afforded to the system component against threats or vulnerabilities; and
a pattern of threats, vulnerabilities or attacks of which the system component possesses or is subjected.

13. A method that implements an econometrics-based control process comprising:
generating by a processor, a stakes matrix to determine a stake that each of at least one stakeholder has in one or more system requirements;
generating by a processor, a dependency matrix to link a status of one or more system components with each of the one or more system requirements;
generating by a processor, an impact matrix to link one possible threat with each of the at least one or more system components based on a ranking of a plurality of threats or a plurality of vulnerabilities;
determining by a processor, a mean failure cost based on a matrix multiplicative product of, at least, the stakes matrix, the dependency matrix, and the impact matrix, wherein the mean failure cost for a particular stakeholder represents a weighted sum in which:
one or more failure costs for the particular stakeholder, wherein each failure cost is associated with one of the one or more system requirements, is weighted by a probability of failure of the associated system requirement, and all of the weighted failure costs for the particular stakeholder, are summed;
determining by a processor, a control strategy based on an analysis of the mean failure cost or a return on investment; and
communicating by a processor, the control strategy to an external component.

14. The method of claim 13 further comprising:
generating a mitigation matrix that links the one or more system requirements with a mitigation cost associated with each of the at least one or more system components.

15. The method of claim 13 further comprising:
initializing an interface engine configured to process system information that is processed to generate the stakes matrix, the dependency matrix, and the impact matrix matrices.

16. The method of claim 13 where the control strategy comprises executing a process in a predetermined allotted time.

17. The method of claim 13 where the impact matrix is generated by processing empirical data gathered over a fixed time period.

18. The method of claim 13 further comprising executing a triage process that reduces the stakes matrix, the dependency matrix, and the impact matrix.

19. The method of claim 13 where the ranking of multiple possible threats or vulnerabilities comprises ranking the threats or vulnerabilities based on a contextual semantic assessment and a threat scenario assessment to determine an impact on requirements or services.

20. The method of claim 13 further comprising executing a sparse factorization on the stakes matrix, the dependency matrix, and the impact matrix.

21. The method that implements an econometrics-based control process of claim 13, wherein the dependency matrix is generated through a Bayesian belief network.

22. A device that implements an econometrics-based control system comprising:
a processor;
a memory in communication with the processor, the memory configured to store processor implementable instructions, where the processor implementable instructions are programmed to:
correlate a plurality of system requirements with each of a plurality of system stakeholders;
identify a stake relating to each of the plurality of system stakeholders and the correlated plurality of system requirements, where the stake is identified by each of the plurality of system stakeholders;

determine a mean failure cost as a function of the identified stake and a failure probability, wherein the mean failure cost corresponds to an amount of money per unit of time, and wherein the mean failure cost for a particular stakeholder represents a weighted sum in which:

each of the stakes for the particular stakeholder is weighted by a probability of failure of the correlated system requirement, and all of the weighted stakes for the particular stakeholder are summed; analyze the mean failure cost to determine a control strategy; and a communication component in communication with the processor and the memory, the communication component configured to communicate the control strategy to a component operable within the control system, where the component implements the control strategy.

* * * * *